US009937857B2

(12) United States Patent
Kalanick et al.

(10) Patent No.: US 9,937,857 B2
(45) Date of Patent: *Apr. 10, 2018

(54) USER-CONFIGURABLE INDICATION DEVICE FOR USE WITH AN ON-DEMAND TRANSPORT SERVICE

(71) Applicant: Uber Technologies, Inc., San Francisco, CA (US)

(72) Inventors: Travis Kalanick, San Francisco, CA (US); Shalin Amin, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,678

(22) Filed: Jun. 6, 2017

(65) Prior Publication Data

US 2017/0267166 A1 Sep. 21, 2017

Related U.S. Application Data

(63) Continuation of application No. 15/342,072, filed on Nov. 2, 2016, now Pat. No. 9,718,397, which is a
(Continued)

(51) Int. Cl.
*G08B 21/00* (2006.01)
*B60Q 1/50* (2006.01)
(Continued)

(52) U.S. Cl.
CPC ............ *B60Q 1/50* (2013.01); *B60Q 1/0094* (2013.01); *B60Q 1/2611* (2013.01); *G06Q 50/10* (2013.01);
(Continued)

(58) Field of Classification Search
CPC ...................................................... G06Q 50/30
(Continued)

(56) References Cited

U.S. PATENT DOCUMENTS

| 6,028,537 A | 2/2000 | Suman |
| 8,646,194 B2 | 2/2014 | Podd |

(Continued)

FOREIGN PATENT DOCUMENTS

| CN | 201918124 | 8/2011 |
| CN | 202213529 | 5/2012 |

(Continued)

OTHER PUBLICATIONS

Examination Report dated Oct. 12, 2017 in Australian App. No. 2017206210.
(Continued)

*Primary Examiner* — Jeffery Hofsass
(74) *Attorney, Agent, or Firm* — Mahamedi IP Law LLP

(57) ABSTRACT

A system and method for configuring an indication device is described. An on-demand service system arranges a transport service for a user to be provided by a driver. The system determines whether the user has specified an output configuration for an indication device in an account of the user. In response to determining that the user has specified an output configuration for the indication device, the system identifies data corresponding to the output configuration and transmits the data to a driver device of the driver to enable the driver device to control the indication device of the driver based on the data.

20 Claims, 16 Drawing Sheets

Related U.S. Application Data continuation of application No. 14/604,573, filed on Jan. 23, 2015, now Pat. No. 9,536,271.

(60) Provisional application No. 61/994,722, filed on May 16, 2014.

(51) Int. Cl.
*G06Q 50/30* (2012.01)
*G07B 13/04* (2006.01)
*B60Q 1/26* (2006.01)
*G06Q 50/10* (2012.01)
*B60Q 1/00* (2006.01)

(52) U.S. Cl.
CPC ........... *G06Q 50/30* (2013.01); *G07B 13/045* (2013.01); *B60Q 2400/00* (2013.01)

(58) Field of Classification Search
USPC ........................... 340/434, 691.1; 701/1, 400
See application file for complete search history.

(56) References Cited

U.S. PATENT DOCUMENTS

| | | |
|---|---|---|
| 2002/0125839 A1 | 9/2002 | Yen |
| 2005/0227704 A1 | 10/2005 | Ferra |
| 2007/0183156 A1 | 8/2007 | Shan |
| 2008/0298058 A1 | 12/2008 | Kan |
| 2009/0192851 A1 | 7/2009 | Bishop |
| 2011/0102165 A1* | 5/2011 | Rahamim ................ B60Q 1/52 340/434 |
| 2012/0092194 A1 | 4/2012 | Crucs |
| 2012/0137256 A1 | 5/2012 | Lalancette |
| 2012/0203599 A1* | 8/2012 | Choi ..................... G06Q 30/02 705/13 |
| 2014/0130387 A1 | 5/2014 | Podd |
| 2014/0223787 A1 | 8/2014 | Richmond |

FOREIGN PATENT DOCUMENTS

| | | |
|---|---|---|
| GB | 2473831 | 3/2011 |
| KR | 10-2012-0090480 | 8/2012 |

OTHER PUBLICATIONS

International Search Report in PCT/US2015/014406 dated May 13, 2015.
Office Action dated Feb. 8, 2017 in Canadian App. No. 2,948,472.
Office Action dated Mar. 3, 2017 in Australian App. No. 2015259802.

* cited by examiner

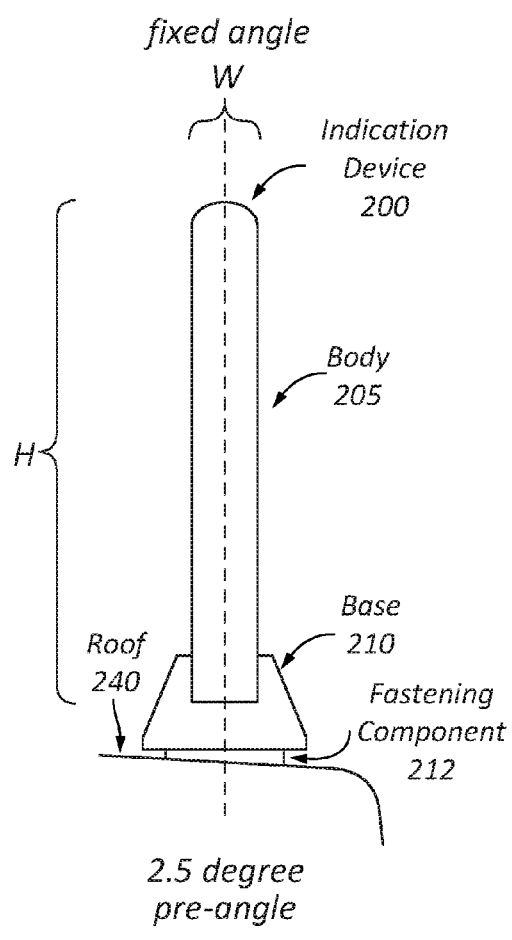
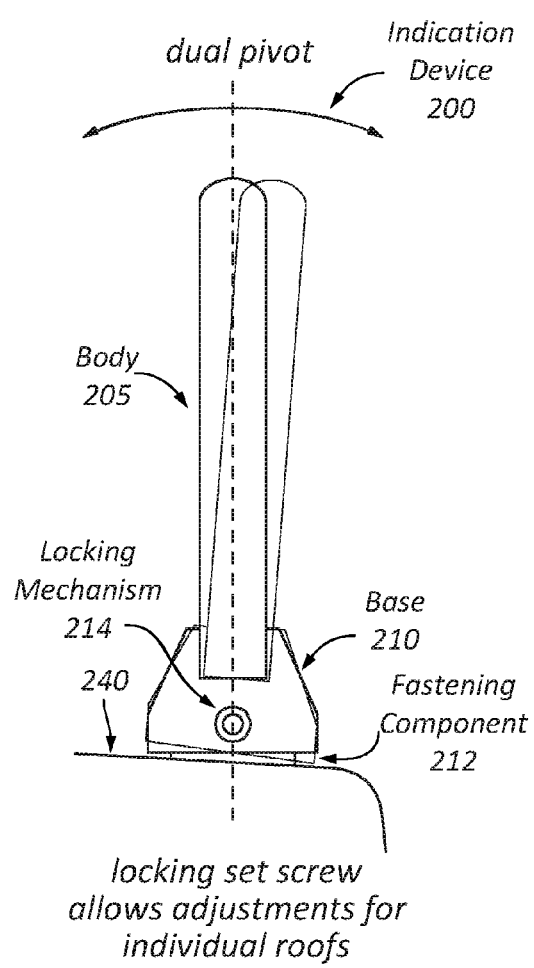
FIG. 2D
FIG. 2E

USER-CONFIGURABLE INDICATION DEVICE FOR USE WITH AN ON-DEMAND TRANSPORT SERVICE

RELATED APPLICATION

This application is a continuation of U.S. patent application Ser. No. 15/342,072, filed Nov. 2, 2016, titled USER-CONFIGURABLE INDICATION DEVICE FOR USE WITH AN ON-DEMAND TRANSPORT SERVICE, which is a continuation of U.S. patent application Ser. No. 14/604,573, filed Jan. 23, 2015, now U.S. Pat. No. 9,536,271 issued Jan. 3, 2017, titled USER-CONFIGURABLE INDICATION DEVICE FOR USE WITH AN ON-DEMAND TRANSPORT SERVICE, which claims benefit of priority to U.S. Provisional Patent Application No. 61/994,722, filed May 16, 2014, titled USER-CONFIGURABLE INDICATION DEVICE FOR USE WITH AN ON-DEMAND SERVICE; the aforementioned priority applications being hereby incorporated by reference in their respective entirety.

BACKGROUND

An on-demand service system can arrange for an on-demand service to be provided for a requesting user by a service provider. In some examples, the on-demand service system can provide information relevant to the requesting user to the service provider for purposes of assisting the service provider in performing the on-demand service.

DETAILED DESCRIPTION

Figure 1:
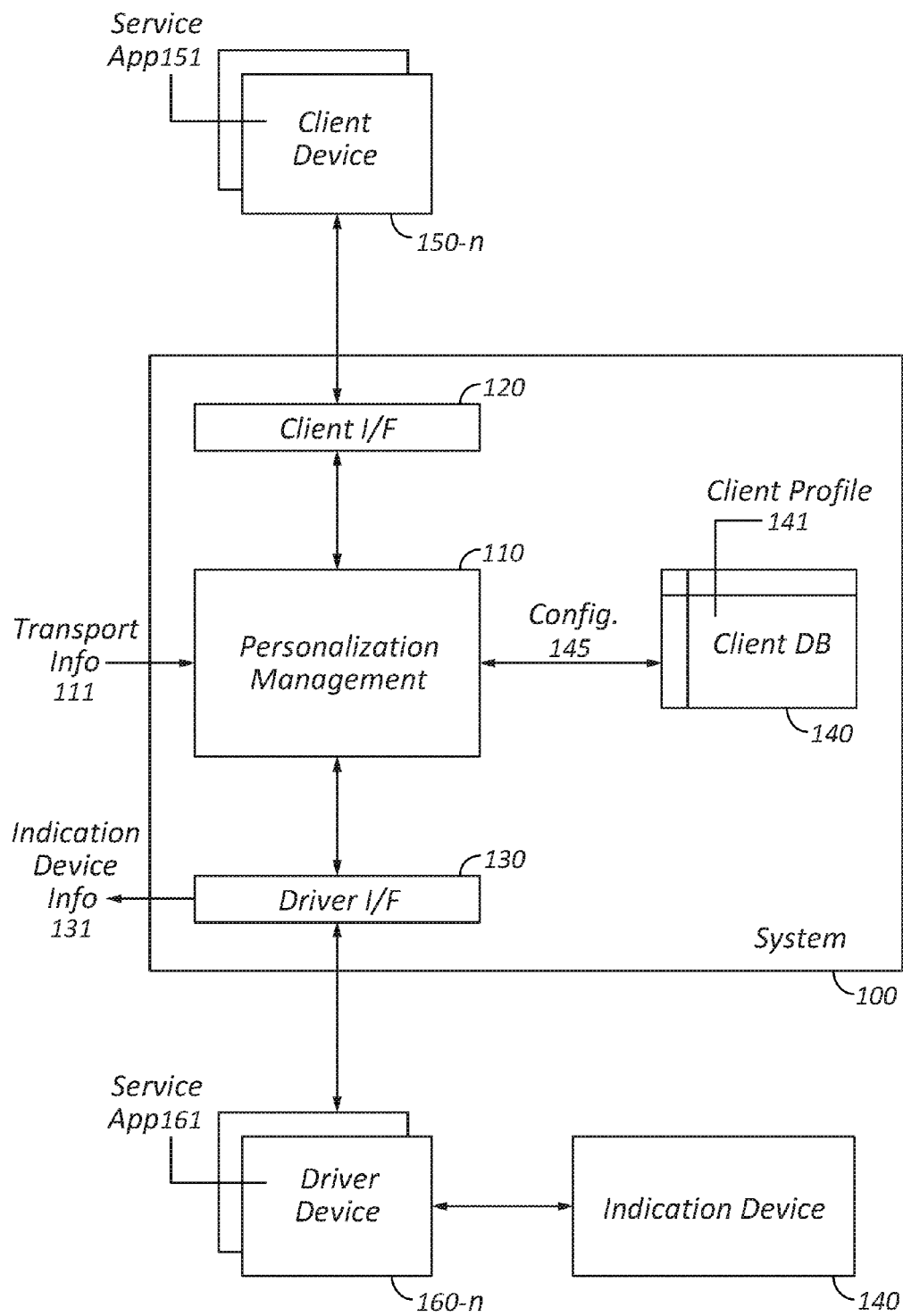
FIG. 1 illustrates an example system to provide configuration information for controlling an indication device for use with an on-demand service.

Examples described herein provide for a system that can automatically configure an indication device (or a display device) for use with an on-demand service. As referred to herein, an indication device is a device that is capable of providing illumination, displaying content, and/or outputting audio, and that can be positioned or fastened, for example, on or within a vehicle operated by a service provider (e.g., a transport service provider, a delivery provider, etc.). Such an indication device can be positioned to be easily visible to a user or positioned proximate to a particular entry or door of the vehicle to indicate to the user where to enter. The system can use information specified or configured by a user of an on-demand service to cause the indication device to dynamically adjust the output for a predefined duration of time. Examples of features that can be configured by a user include a color(s), a pattern(s), an illumination sequence(s), text, visual content, video, and/or audio. In this manner, when the service provider approaches a user for purposes of providing the on-demand service, the indication device can be dynamically configured and personalized in a manner specified and recognizable by the user, thereby informing the user which vehicle has been assigned to the user to provide the on-demand service.

According to some examples, a transport personalization system can be a part of or be in communication with the on-demand service system. In one example, the on-demand service system can arrange a transport service for a user by receiving a request for transport from the user's device, selecting a driver from a plurality of available drivers to perform the transport service for that user, sending an invitation to the selected driver's device, and receiving an acceptance of the invitation by the selected driver. The on-demand service system can associate an identifier of the user and an identifier of the driver with an entry for that transport service. Once the on-demand service system arranges the transport service for the user and the driver, the transport personalization system can access a user database to determine whether that user has specified an output configuration for an indication device (e.g., determine whether the user has personalized at least one aspect of the transport service). For example, the transport personalization system can determine if the user has specified an output configuration in the user's account. If the user has specified an output configuration, the transport personalization system can identify data corresponding to the output configuration and transmit the data to the driver device of the driver that is to provide the transport service for the user. In the case where the driver is in possession of and uses an indication device, the data can enable the driver device to control the indication device using the data, such as during at least a duration of the transport service (e.g., while the transport service is in progress for that user). In such an example, once the transport service is completed for the user, the driver device can be instructed or caused to no longer control the indication device using the user's output configuration.

As described herein, the output configuration for an indication device can specify the manner in which the indication device is to output or emit light or content. Depending on implementation, the output configuration can specify one or more colors of light to be outputted by the indication device, one or more patterns in which light is to be outputted by the indication device, and/or one or more sequences of illumination in which light is to be outputted by the indication device, so that different portions of the indication device can be illuminated at different times. A user can access the user's account via a portal on the user's computing device, such as through use of a webpage or a designated client service application in communication with the on-demand service system and/or the transport personalization system, in order to configure the output configuration.

Still further, in some examples, the on-demand service system and/or the transport personalization system (collectively referred to herein as the system), can monitor the transport service to determine the state of the transport service. In some examples, the transport service can be in progress for a user from the time the selected driver accepts an invitation to perform the transport service or from the time the selected driver begins to travel from a position in which the selected driver accepted the invitation until the transport service has been completed by the driver (e.g., the driver has dropped off the user at the user's destination). The system can monitor the transport service using information received from the driver device (e.g., periodically or intermittently from driver user input), such as from a driver service application operating on the driver device, and/or information about the transport service (e.g., the pickup location and/or the destination location specified by the user). Depending on implementation, the system can transmit the data corresponding to the output configuration to the driver device during the progress of the transport service, but before the driver arrives at the pickup location specified by the user in the user's request for the transport service.

In some variations, the indication device (also referred to herein as a lighting or illumination device) can have different housing shapes or features to be fixed to a vehicle. For example, an indication device can include a body, a power source or power input port to receive power from a power source, a communication interface, and a base. Depending on implementation, the body can be formed of a translucent, semi-transparent, or transparent material that can be at least partially illuminated by a light source. As an addition or an alternative, the body can include or be formed as a display device that can output content (e.g., a flat panel display). In either examples, the body can be shaped to have at least one surface that is substantially flat and can have dimensions in which its length is substantially larger (e.g., two or more times larger) than both its height and its width, and/or its height is substantially larger (e.g., two or more times larger) than its width (e.g., the body can be in the shape of a blade). The body can provide illumination and/or output content that is customized based on the user-specified output configuration information.

The body can also be coupled to a base that extends at least partially along the length of the body. The base can include one or more fastening mechanisms or structures to enable the indication device to be coupled or fastened (e.g., either permanently or temporarily) to a vehicle. In one example, the base can also house one or more components of the indication device, such as a communication interface, a light source, a power source or a port for the power source, a light or display controller, wires or connection components, etc. The communication interface can enable the indication device to communicate (e.g., wirelessly or via a wire or cable) with the driver device to receive configuration data.

In another example, the indication device can have a body that has a length, a width, and a height, with its length being substantially greater (e.g., two or more times larger) than its width and its height, but its width being greater than its height. The body can have a first façade or surface that extends along the length and the width of the body. The body can also house one or more light sources to illuminate at least a portion of the first façade. The indication device can include a base that is coupled to the body and that extends along at least a portion of the length of the body and at least a portion of the width of the body. The indication device can also include one or more fastening mechanisms to enable the illumination device to adhere to a surface such that the first façade of the body faces the surface. Such a surface can be an interior surface of a window of a vehicle or a windshield. The indication device can communicate with the driver's device using a communication interface (e.g., wireless and/or a wire/cable) so that the controller device can receive data from the driver's device in order to control the one or more light sources. In this manner, when the driver's device receives the data corresponding to a user's output configuration, the driver's device can provide control signals to the indication device to control the manner in which the indication device outputs or emits light.

As used herein, a client device, a driver device, and/or a computing device refer to devices corresponding to desktop computers, cellular devices or smartphones, personal digital assistants (PDAs), laptop computers, tablet devices, television (IP Television), etc., that can provide network connectivity and processing resources for communicating with a notification system and/or a dispatch system over a network. A driver device can also correspond to other devices of a transit object, such as an in-vehicle computing system, or custom hardware, etc. The client device and/or the driver device can also each operate a designated service application that is configured to communicate with the on-demand service system and/or the transport personalization system. Still further, while some examples described herein relate to transport services, the systems describe herein can be used to provide other on-demand services, such as a food truck service, a delivery service, an entertainment service, etc.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices such as servers, desktop computers, cellular or smartphones, personal digital assistants (e.g., PDAs), laptop computers, printers, network equipments (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system to provide configuration information for controlling an indication device for use with an on-demand service. According to an example, a personalization system, such as the system 100 of FIG. 1, can provide a mechanism that enables a user to control what is illuminated or displayed on an indication device that is in possession by a service provider. For example, the indication device can be a lighting or display device that is fastened to a vehicle, so that when the vehicle approaches the user for pick up, the indication device can illuminate a color (and/or in an illumination sequence) specified by the user, thereby indicating to the user which vehicle the user is to enter.

In one example, the system 100 can include a personalization management 110, a client device interface 120, a driver device interface 130, and a client database 140. The system 100 can be a part of or communicate with an on-demand service system and/or can include other components or databases, such as a configuration database, which are not illustrated in FIG. 1 for purpose of simplicity. The components of the system 100 can combine to enable a user that requests an on-demand service to configure an indication device operated by a service provider (e.g., a lighting device 170) for use with the on-demand service (e.g., before or after requesting the on-demand service). Logic can be implemented with various applications (e.g., software) and/or with firmware or hardware of a computer system that implements the system 100.

Depending on implementation, one or more components of the system 100 can be implemented on a computing device, such as a server, laptop, PC, etc., or on multiple computing devices that can communicate with the client devices 150 and the driver devices 160 over one or more networks. In some examples, a computing device can operate or execute an application to perform one or more of the processes described by the various components of the system 100. The system 100 can also be implemented through other computer systems in alternative architectures (e.g., peer-to-peer networks, etc.).

The system 100 can communicate, over one or more networks via a network interface (e.g., wirelessly or using a wire), with the client devices 150 (e.g., mobile computing devices operated by clients or users/customers) and the driver devices 160 (e.g., mobile computing devices operated by drivers) using a client device interface 120 and a driver device interface 130, respectively. The client and driver device interfaces 120, 130 can enable and manage communications between the system 100 and each of the client and driver devices 150, 160. In some examples, each of the client devices 150 and the driver devices 160 can individually operate a designated service application 151, 161, respectively, that interfaces with the respective device interfaces 120, 130 to communicate with system 100. According to some examples, the applications can include or use an application programming interface (API), such as an externally facing API, to communicate data with the device interfaces 120, 130. The externally facing API can provide access to system 100 via secure access channels over the network through any number of methods, such as web-based forms, programmatic access via restful APIs, Simple Object Access Protocol (SOAP), remote procedure call (RPC), scripting access, etc.

As described herein, the system 100 can be a part of or communicate with an on-demand service system, such as a dispatch system of the on-demand service system (not shown in FIG. 1). Examples of an on-demand service can include a transport service, a food truck service, a delivery service, a traveling entertainment service, etc. A dispatch system for a transport service, for example, can receive requests from users operating client devices and arrange for transport services to be provided to the users by service providers (e.g., drivers). The driver devices 160 can provide current or real-time information about the drivers to the dispatch system and/or the system 100, and based, at least in part, on the driver information, the dispatch system can determine the pricing for the transport service in a given geographic region, can select a driver for a requesting user, can determine if the transport service has been successfully completed, etc. In addition, when a transport service is arranged for a user, the system 100 can receive transport information 111 about the transport service from the on-demand service system and determine whether to transmit user-specified configuration data to the driver device of the driver selected to provide the transport service. The configuration data can enable the driver device to control the driver's indication device for the user.

As illustrated in FIG. 1, a driver device 160 can be in communication with an indication device 170. A driver of a vehicle that operates the driver device 160, for example, can be in possession of the indication device 170, which can be fixed or fastened (e.g., permanently or temporarily) to the vehicle. The indication device 170 can include a communication interface that enables the indication device 170 to connect to the driver device 160 wirelessly and/or using a wire(s) or cable(s). For example, the driver device 160 can wirelessly communicate with the indication device 170 using a Bluetooth protocol. As an addition or an alternative, the indication device 170 can be in communication with system 100 to be controlled by operations of the system 100 (e.g., over one or more networks or via the driver device 160). The indication device 170 can include an output device, such as an illumination mechanism or a display, that can output or emit light or display content based on user-specified configurations.

According to some examples, the personalization management 110 can receive the transport information 111 of the arranged transport service from the dispatch system when the transport service is arranged for a user and a driver. The transport information 111 can include (i) an identifier (ID) corresponding to the arranged transport service, (ii) an identifier of the user and/or the client device 150 receiving the transport service, (iii) an identifier of the driver and/or the driver device 160 providing the transport service, and/or (iv) status information about the driver with respect to the transport service. Depending on implementation, the personalization management 110 can receive the transport information 111 in response to the transport service being initially arranged by the dispatch system. The personalization management 110 can determine when and whether to transmit configuration information specified by the user for an indication device 170 to the driver. The personalization management 110 can also receive the status information of the driver (e.g., periodically or in response to changes to the driver's status information) during a duration from when the transport service is arranged until completion of the transport service.

When the personalization management 110 receives the transport information 111, the personalization management 110 can use the user ID to access the client database 140.

The client database 140 can store a plurality of client profiles 141 (or client accounts) for each user that has an account with the on-demand service system. A client profile 141 can include (or be associated with) a user identifier, contact information, payment/billing information, device and/or the service application 151 information (e.g., version information), user preferences, historical information about previous transport services provided for the user, etc. The user preferences can be configured by the user and can include indication (or sign) preferences, such as color, text, pattern, illumination sequence, media content, etc., related to the output of an indication device.

The personalization management 110 can perform a lookup of the client profile 141 (e.g., using the user's ID or user's device ID) and determine if the user has specified an output configuration for an indication device. If the user has specified (e.g., in the user preferences) the output configuration, the personalization management 110 can determine and/or retrieve the configuration data 145 corresponding to the specified configuration for that user. In one example, the personalization management 110 can receive information about the output configuration from the client profile 141 and retrieve the configuration data 145 from a configuration database. On the other hand, if the personalization management 110 determines that the user has not specified an output configuration, the personalization management 110 can transmit a message or a prompt (e.g., an in-application message displayed by the service application 151 or a text message) to the user's client device 150 informing the user that the user can configure one or more indication preferences. If the user operates the service application 151 and provides indication preferences, the personalization management 110 can receive the user's preferences and store the preferences with the user's profile 141 in the client database 140. If the user does not provide indication preferences, however, the personalization management 110 can store or maintain default indication preferences in the user's profile 141. In some examples, the personalization management 110 can perform these steps after the transport service has been arranged but before the driver has arrived at the pick up location and/or before the driver has initiated the transport service.

The personalization management 110 can transmit the user's configuration data 145 corresponding to the user's indication preferences (or default configuration data if the user has not specified indication preferences) to the driver device 160. For example, the personalization management 110 can determine the driver that is to provide the transport service by identifying the driver's ID from the transport information 111. Depending on implementation, if there is no configuration data 145 for indication preferences specified by the user, the personalization management 110 can transmit default configuration data to the driver device 160 or transmit a message (without sending default configuration data) indicating to the driver's service application 161 operating on the driver device 160 that the driver's own configuration data or default configuration data is to be used for controlling the indication device 170.

The driver device 160 can run the service application 161 for purposes of communicating with the on-demand service system (and/or the system 100). For example, the driver can operate the service application 161 when the driver is ready or available to provide transport services. The service application 161 can also enable the driver device 160 to communicate with the indication device 170 using the communication interfaces of the driver device 160 and the indication device 170. In one example, the driver device 160 and the indication device 170 can communicate with each other using a Bluetooth protocol or using another short range wireless technology protocol. In another example, the driver device 160 and the indication device 170 can communicate with each other over a wire or cable. The service application 161 can receive the configuration data 145 from the system 100 and control the indication device 170 using the configuration data 145 via one or more control signals over the communication interfaces of the driver device 160 and the indication device 170. In one example, the indication device 170 can include a device controller that provides control signals to the light source or display of the indication device 170 based on the configuration data 145.

The service application 161 can also receive invitations for transport services from the on-demand service system and provide location information and/or status information of the driver to the on-demand service system. The service application 161 can interface with components of the driver device 160, such as the global positioning system (GPS) component of the driver device 160 to determine a current position or location of the driver device 160. In one example, after (and before) the driver accepts the invitation to provide the transport service for the user via interaction with the service application 161, the driver device 160 can periodically transmit GPS location data points to the on-demand service system (and/or the system 100).

According to an example, the on-demand service system can determine different states of the transport service or the driver by using information received from the service application 161. As referred to herein, a state of the transport service or a state of the driver can refer to the current condition of the driver when providing transport service. A driver can be in one of a plurality of different states that include, for example: (i) unavailable (e.g., off duty), (ii) available (e.g., on duty) but not yet providing transport service, (iii) en route to the pickup location of the user after accepting an invitation for transport service, (iv) arriving at the pickup location (e.g., the driver is approaching the pickup location), (v) on trip (e.g., the user has entered the vehicle, the transport service has begun), or (vi) completed trip (e.g., the driver has completed the transport service by dropping off the user at the user's destination location). The state information used by the on-demand service system to keep track of the driver, determine whether it can select the driver for a transport service, determine how long and how far the driver has driven the user for purposes of determining the fare, etc. Depending on examples, the driver operating the driver device 160 (and in possession of the indication device 170) can indicate what state the driver is currently in by providing input to the service application 161 (e.g., input that the driver has accepted the invitation, that the driver is approaching the user, that the driver has completed the transport service, etc.). The service application 161 can provide state information to the on-demand service system.

In another example, the on-demand service system can use location information from the driver's device 160 and/or the transport information 111 to automatically determine the driver's state or the state of the transport service. For example, the on-demand service system can determine that the driver is en route to the pickup location in response to receiving the acceptance of the invitation from the driver device 160 and/or in response to determining that the driver has changed positions (from GPS data of the driver device 160) since the acceptance. In another example, the on-demand service system can programmatically determine that the driver is arriving at the pickup location or has reached the pickup location by comparing the location data of the driver with the specified pickup location of the user (e.g., if the driver's position is within a predetermined distance of the user's current location or the pickup location). Still further, similarly, the on-demand service system can programmatically determine that the driver has completed the transport service by comparing the location data of the driver with the specified destination location of the user, if provided. Accordingly, in variations, the on-demand service system can provide the state information to the service application 161 and/or the service application 161 can provide the state information to the on-demand service system. In this manner, in either examples, the service application 161 and the system 100 can recognize the state of the transport service or the driver.

According to some examples, based on the state of the transport service or the driver, the system 100 and/or the service application 161 can control the operation of the indication device 170. As described herein, the system 100 can provide the configuration data 145 for the particular user to the selected driver's device 160 for use during the specific transport service. In this manner, when that driver completes the transport service, he or she can receive another invitation for transport service for another user, and receive, if any, the configuration data 145 for the other user during the progress of another transport service. During the progress of the transport service, the service application 161 can use the state information to control the indication device 170 to output different colors, content, patterns, etc., based on the state of the transport service or the driver. In other words, based on the indicated state (e.g., arriving now or on trip), the service application 161 can tailor the output of the indication device 170.

For example, the configuration data 145 of the user preference can specify that a blue color to be outputted by the indication device 170. When the driver accepts a transport request and is en route to the pick up location of the user for the transport service, the service application 161 can cause the indication device 170 to output a default color or be turned off to conserve power because the user will not yet see the vehicle or the indication device 170. At a time when the driver is approaching the pickup location, the driver can input on the service application 161 that the driver is close to the user's pickup location or the service application 161 and/or the on-demand service system can determine that the driver's current location is within a predetermined distance of the pickup location of the user. The state of the transport service can correspond to the driver "arriving now." When the service application 161 determines that the transport service is to change states from "en route" to "arriving now," for example, the service application 161 can trigger or control the indication device to output the user's specified color, e.g., blue, (and/or other preferred output content, patterns, or sequences) so that the user can see which vehicle is approaching and will provide the service for the user. The service application 161 can also control the indication device to output the user's specified display/output preferences in a specific configuration that is based on the transport state.

As an addition or an alternative, the system 100 can receive information about the transport state from the service application 161 and the personalization management 110 can use the configuration data 145 of the user preference to control the indication device 170 based on the transport state (e.g., as opposed to the service application 161 controlling the indication device 170). For example, the indication device 170 can include network resources to be in communication with system 100 over one or more networks (and/or via the driver device 160). In such an example, the system 100 can control the output of the indication device 170 without input provided by the driver operating the driver device 160.

In this manner, by enabling the user to provide user-specified preferences for the indication device 170, the system 100 can provide the user with a personalized on-demand service experience. In addition, in some situations, such as during darkness or when the user is at a crowded street corner or area (e.g., an airport) and waiting for the vehicle, the personalized experience can indicate to the user which vehicle is the user's vehicle for purposes of the transport service. The indication device 170 can show the user's specified color, content, pattern, etc., so that in a group of vehicles, the user can easily determine which vehicle to enter. Still further, the indication device 170 can also display or include features, such as a trademark or name, associated with the on-demand service provider, thereby providing brand recognition for the on-demand service provider.

As an addition or an alternative, the indication device 170 can also include other components or sensors, such as a GPS receiver and/or an inertial measurement unit (INU). These components or sensors can be used to periodically determine real-time conditions of the vehicle while the indication device 170 is powered on and in operation. The indication device 170 can provide to the driver device 160, via one or more communication interfaces, data determined from the components or sensors (referred to herein as indication device information 131). The service application 161 can store the indication device information 131 in a memory resource and/or concurrently provide the indication device information 131 to the on-demand service system and/or the system 100. The indication device information 131 can be used by the on-demand service system to complement or supplement data corresponding to a transport service or to determine, with higher accuracy, the bearing, the movement, the direction of movement, etc. of the driver's vehicle (before, after, or during transport service).

Indication Device Examples

Figure 2A:
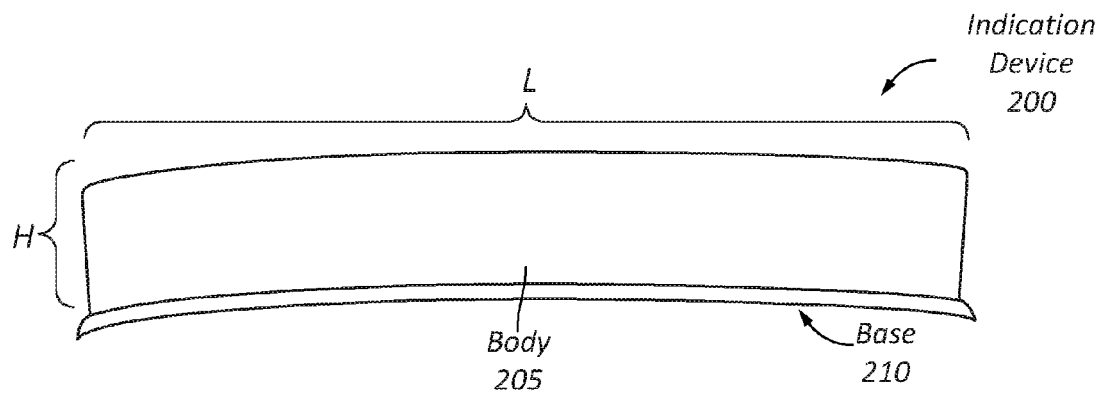
FIGS. 2A through 2R illustrate example indication devices for use with an on-demand service.
Figure 2B:
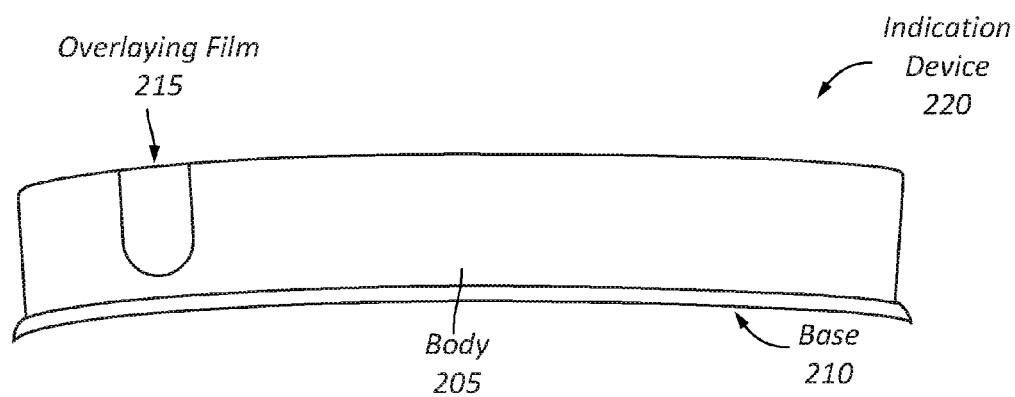
Figure 2C:
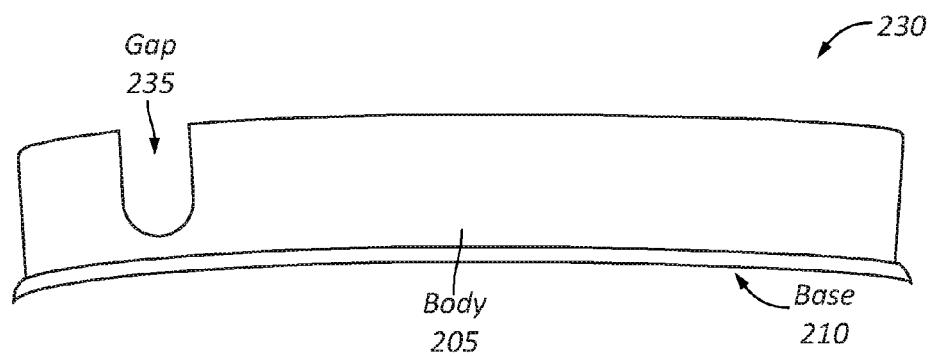
Figure 2F:
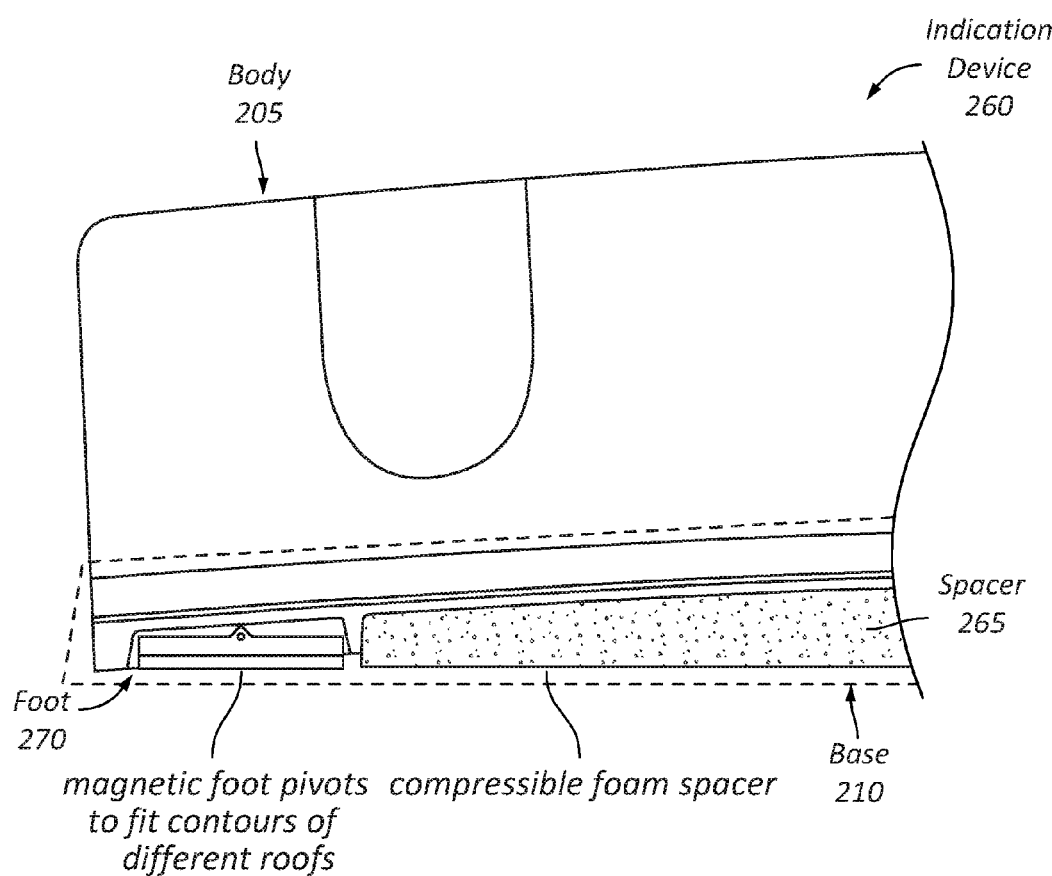
Figure 2G:
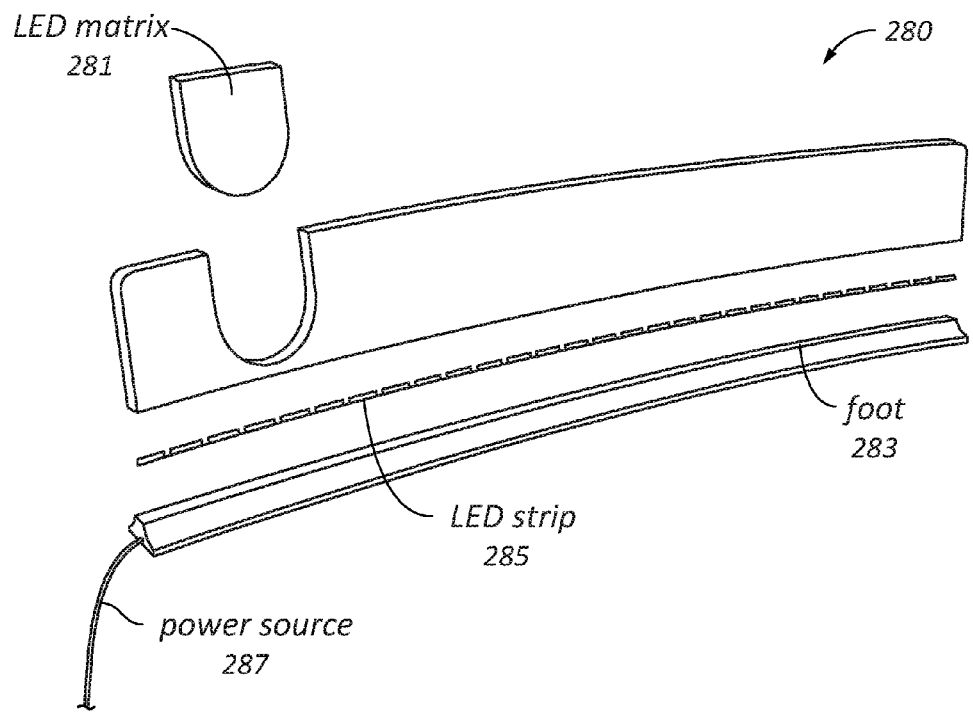
Figure 2H:
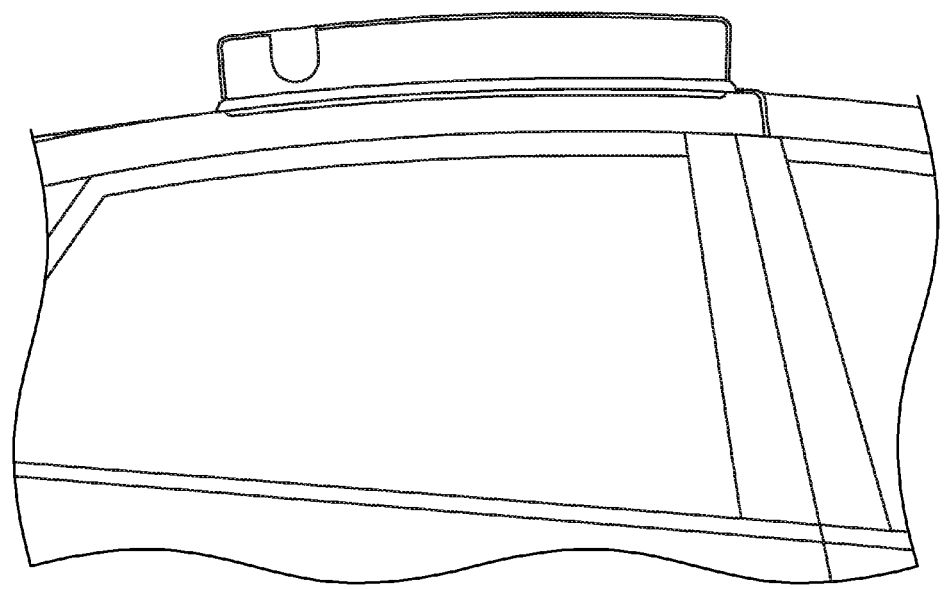
Figure 2I:
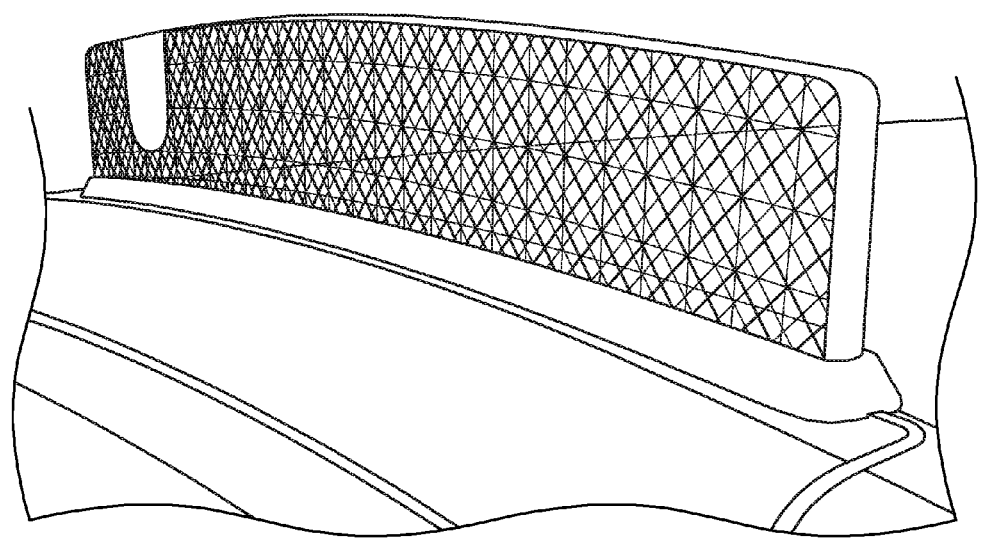
Figure 2J:
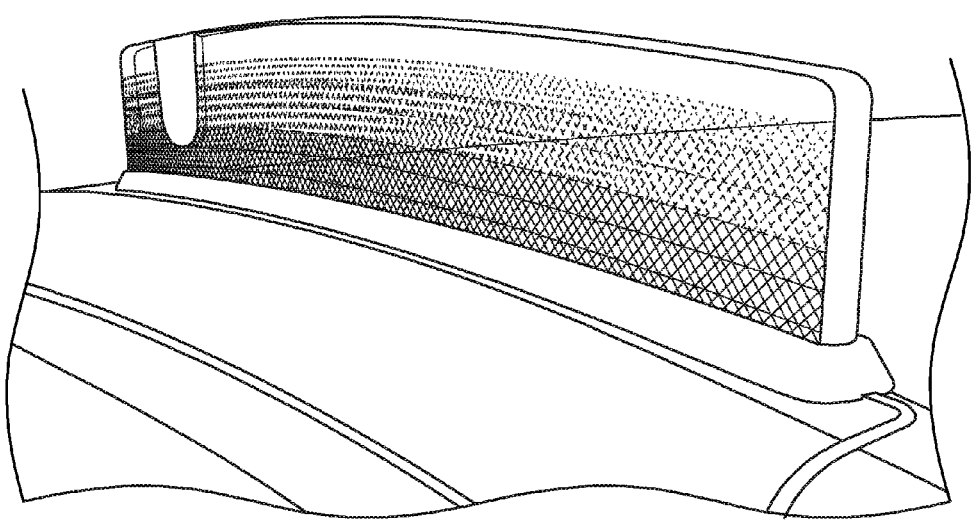
Figure 2K:
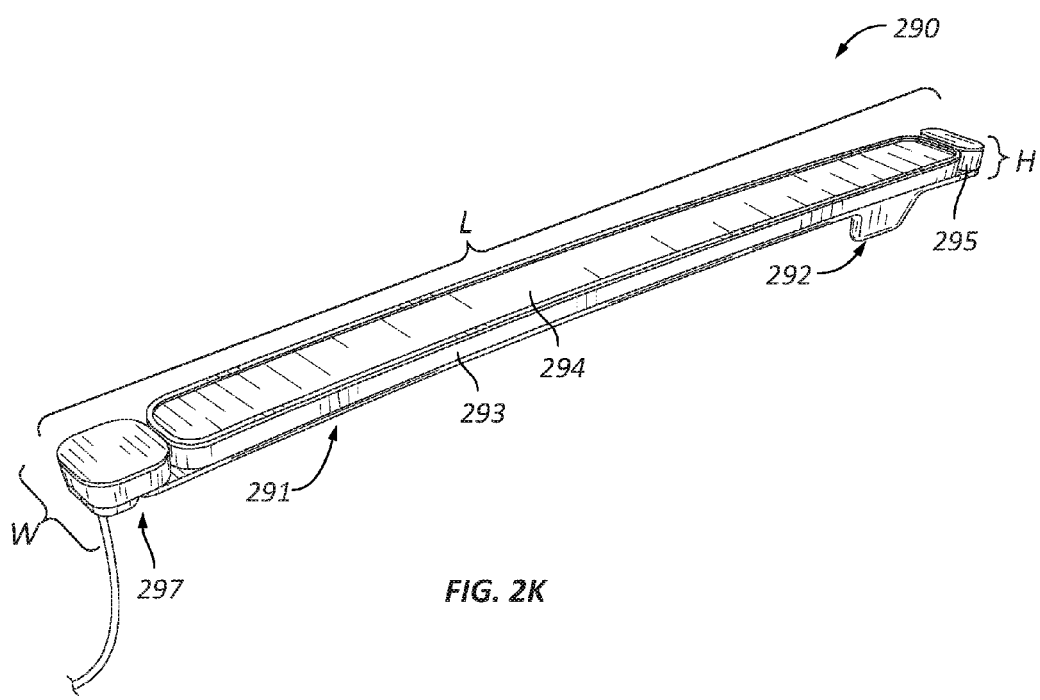
Figure 2L:
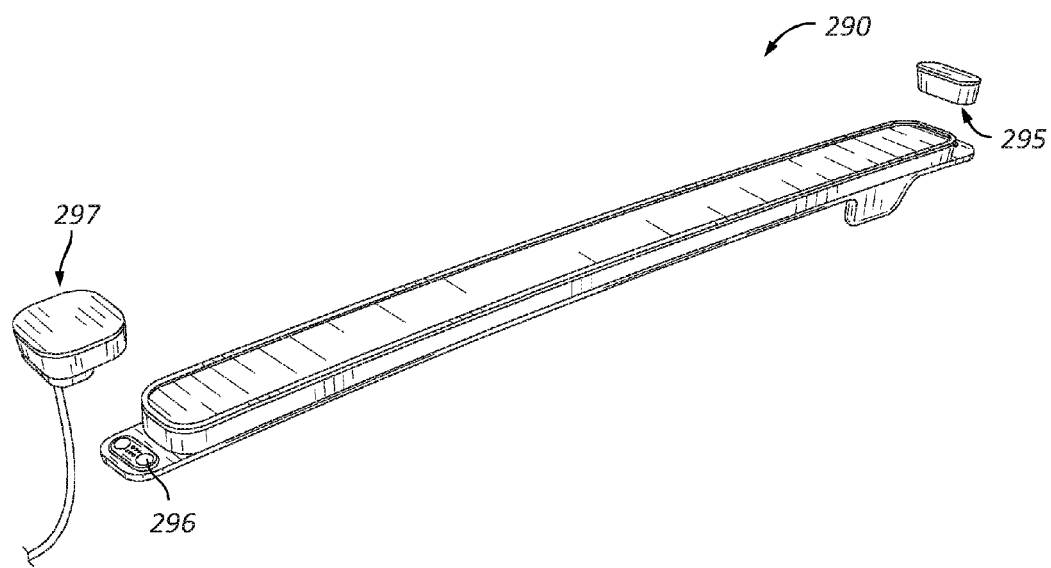
Figure 2M:
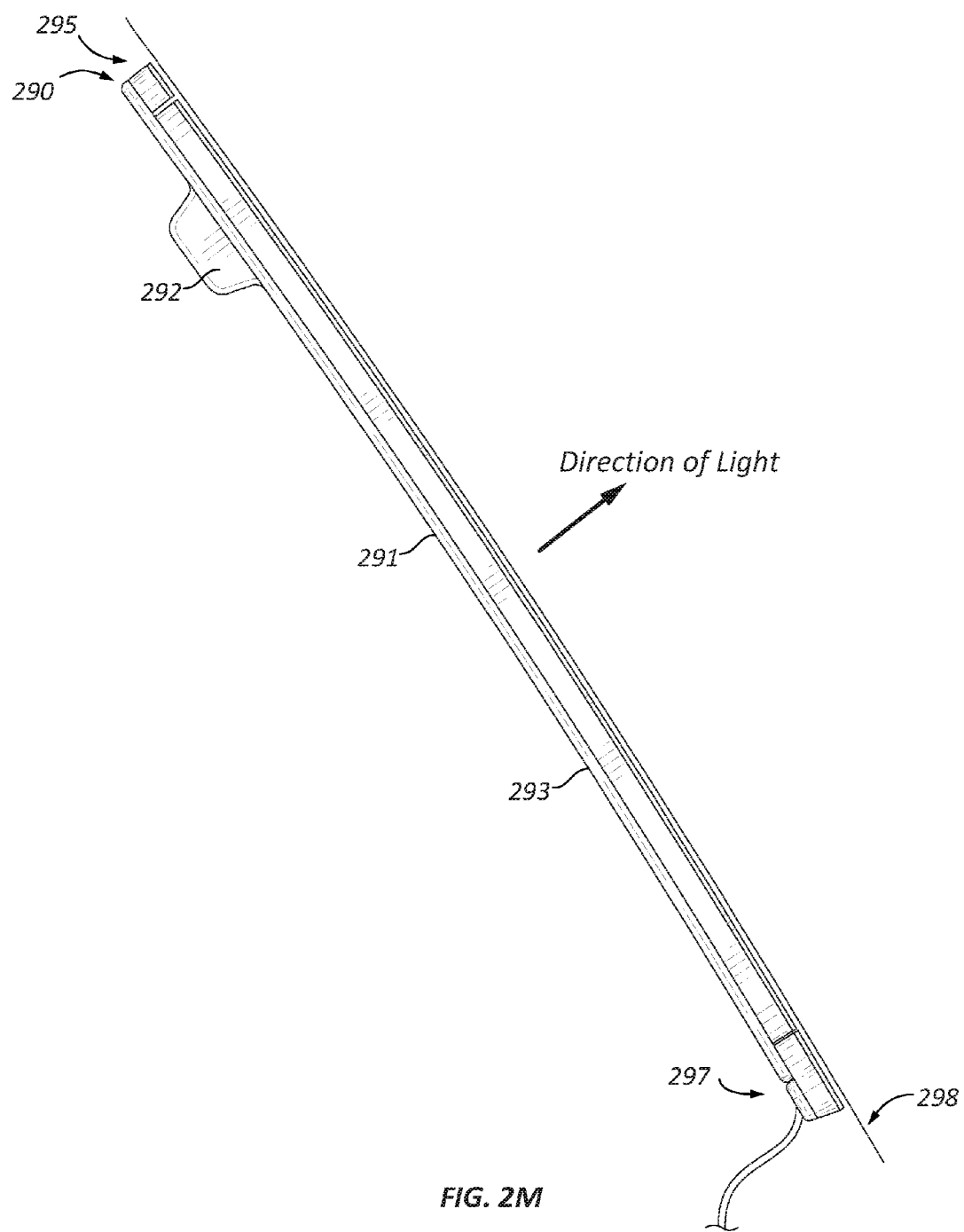
Figures 2N, 2O:
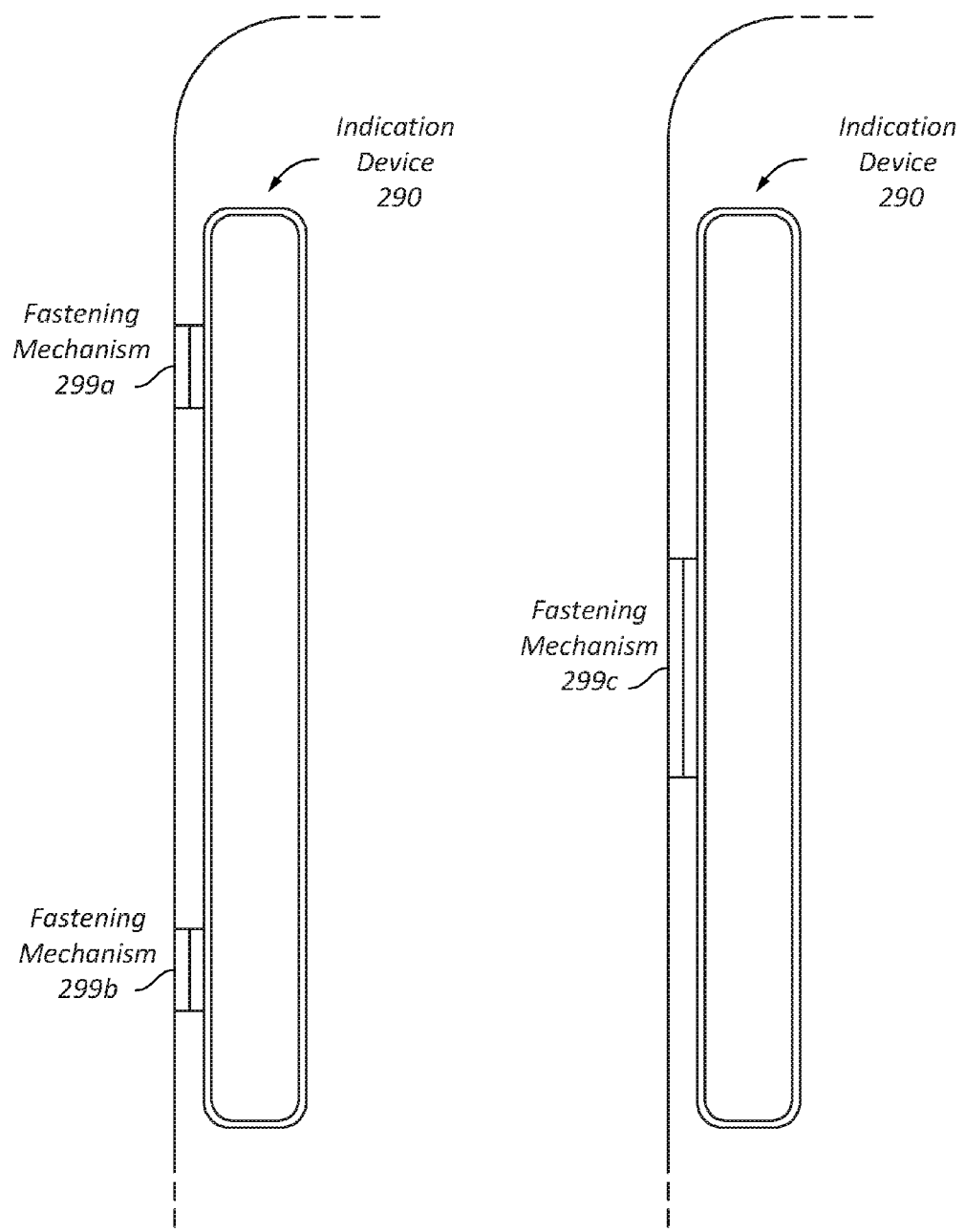
Figure 2P:
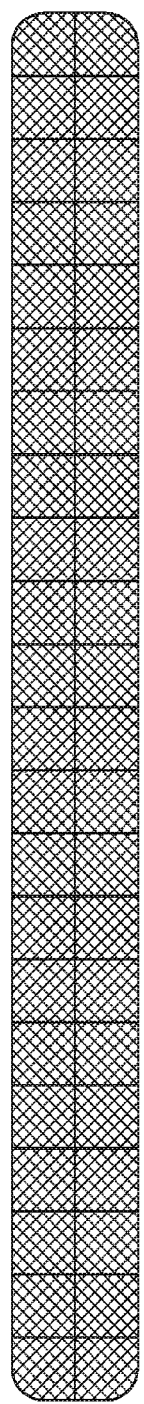
Figure 2Q:
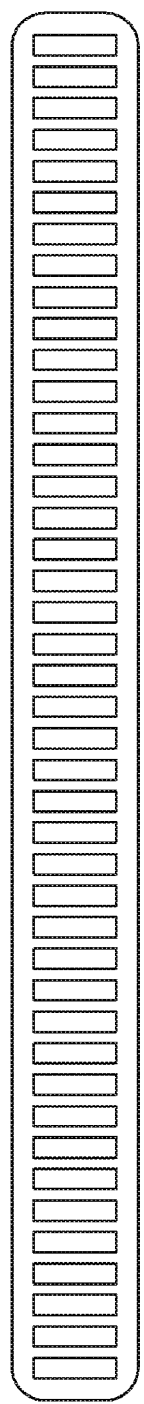
Figure 2R:
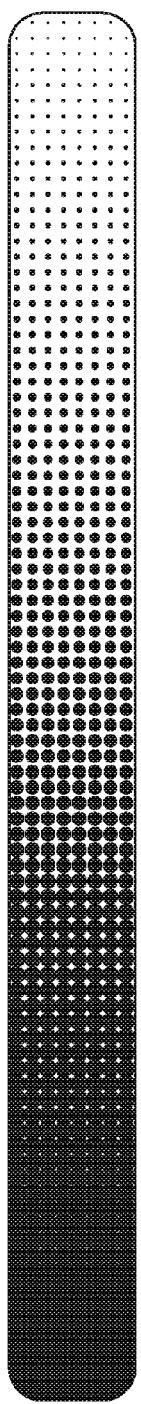

FIGS. 2A through 2R illustrate example indication devices for use with an on-demand service. The example indication devices described in FIGS. 2A through 2R can correspond to the indication device 170 described with an example of FIG. 1. In one example, FIGS. 2A through 2J illustrate an indication device that can be positioned on top of a surface of a vehicle. In another example, FIGS. 2K through 2R illustrate an indication device that can be positioned within a vehicle. While the examples of FIGS. 2A through 2R depict the indication devices having specific configurations, an indication device can be constructed to have a variety of different shapes or sizes.

FIG. 2A illustrates an indication device 200 including a body 205 and a base 210 (other components are not shown in FIG. 2A for purpose of simplicity). The body 205 can be formed of a translucent, semi-transparent, or transparent material that can be at least partially illuminated by one or more light sources. The light source(s) can be housed in the body 205 and/or the base 210. As an addition or an alternative, the body 205 can include or be formed as a display device that can output content (e.g., a flat panel display, such as an LCD display or LED display). Based on control signals provided by a controller or a circuit of the indication device 200, the body 205 can illuminate light (e.g., via the light source) and/or display content in a specified manner. For example, the body 205 can illuminate in a particular color (e.g., blue), illuminate a particular pattern (e.g., hash pattern, polka dot), and/or illuminate in a particular sequence (e.g., blink periodically, fade in or fade out). The body 205 can be formed (e.g., manufactured) in different shapes, such as a rectangular shape, trapezoidal shape, a slightly curved shape along a portion of the length of the body 205, etc. The base 210 can also be shaped in accordance with the body 205 and/or have at least a curved shape to match a curvature of a roof or upper region of a door of a vehicle.

In some examples, the body 205 can be shaped to have an overall length, L, that is substantially greater than the overall height, H, and the overall width, W (see FIG. 2D or 2E). In addition, in one example, the height can also be substantially greater than the width, so that the body 205 is in the shape of a blade. For example, the overall length can be three, four, or five, etc., times greater than the overall height, while the overall height is three, four, or five, etc., times greater than the width. In this manner, the body 205 can have a surface that extends along the length and height, thereby providing a large surface area that can be at least partially illuminated.

In the examples described in FIGS. 2A through 2J, a light source(s) can be provided or arranged within the body 205, along the edge of the body 205, and/or within the base 210 to illuminate the body 205 in a lighting or output configuration indicated by a user. For example, a light source or plurality of lights sources, such as an LED strip can be provided underneath the body 205 along a bottom edge of the body 205 (not shown in FIG. 2A), but within the base 210. The LED strip can be controlled, based on the output configuration data, to illuminate in a specific manner, thereby providing lighting on the body 205 and/or along the edge or perimeter of the body 205 (e.g., edge lighting). The body 205 can have a textured perimeter along its edge in order to enhance the edge lighting. In another example, light sources can be provided along the edge of the body 205 to provide edge lighting.

Referring to FIG. 2B, another example indication device 220 is illustrated in which the body 205 can include additional features for purposes of visually enhancing light configurations for a particular user. In one example, the body 205 can include an overlaying film 215 having a particular shape or design corresponding to an icon or trademark of the on-demand service provider. The overlaying film 215 can be positioned on a surface of the body 205 and can be formed of a material to cause light to be outputted, for example, in a more prominent fashion, in the region of the film 215. In this manner, when the light source(s) of the indication device 200 is controlled based on the output configuration, the body 205 can illuminate both the edge/perimeter of the body 205 and the overlaying film 215 prominently.

Another example of the indication device 230 is illustrated in FIG. 2C, in which the body 205 is unitarily formed or manufactured to include a gap 235 or recessed portion. The gap 235 can also be formed to have a shape of an icon or trademark of the on-demand service provider. When the indication device 230 is illuminated, for example, edge lighting can be provided along the perimeter of the body 205, including the perimeter along the gap 235. As another example, a separate lighting device and/or material can also be inserted in the gap 235 for purposes of enhancing illumination (similar to FIG. 2B, for example, but instead of a film, the separate lighting device and/or material can be shaped to fit inside the gap 235).

FIGS. 2D and 2E illustrate a side view of an indication device, such as described in FIGS. 1, 2A through 2C, and 2F through 2J. In FIG. 2D, the indication device 200 has a body 205 that is substantially flat along its length (e.g., flat faces) to maximize the edge lighting and/or the surface area for display and/or illumination. As seen in FIG. 2D, in one example, the overall width of the body 205 is substantially smaller than the overall height of the body 205 (and the overall length of the body 205 as seen in FIG. 2A). By minimizing the thickness or width of the body 205, the overall weight and bulkiness of the indication device 200 can also be minimized, thereby reducing the amount of force or fastening grip needed to fasten the indication device 200 to a vehicle.

Another benefit for shaping the body 205 to have the exemplary dimensions is to reduce the amount of material (e.g., plastic, glass, etc.) necessary for manufacturing the indication device 200, while maintaining a large surface area for purposes of maximizing lighting. Still further, reducing the overall size and weight of the indication device 200 can enable a service provider to easily and quickly fasten or remove the indication device 200 from the vehicle (e.g., the driver can do it by himself or herself). This can be important as a driver can quickly fasten the indication device 200 to the roof of his vehicle, for example, when the driver is electing to go on-duty (e.g., be available to provide transport services), and similarly, quickly remove the indication device 200 when the driver will go off-duty.

Referring back to FIG. 2D, a cross sectional view of an exemplary indication device 200 illustrates the body 205 being inserted and held by a base 210. The body 205 can be inserted, fastened, removed, etc., from the base 210. The base 210 includes a fastening component 212 in which the base 210 can be fastened to a roof 240, for example, of a vehicle. The base 210 can be configured to maintain the body 205 in a specific position or orientation (e.g., the body 205 is maintained at a fixed angle relative to the roof 240 of the vehicle).

In another example, in FIG. 2E, a cross sectional view of an exemplary indication device 200 illustrates the body 205 being able to pivot relative to the roof 240 of the vehicle. In this example, the base 210 can include a locking mechanism 214, such as a locking set screw(s), to allow the body 205 to be pivoted in either direction relative to the base 210 and/or the fastening component 212. The locking mechanism 214 can enable the indication device 200 to be configured on a case-by-case basis, so that a driver who operates one type of vehicle (and has a roof 240 with a different surface shape than another type of vehicle) can adjust the angle of the body 205.

FIG. 2F illustrates an indication device 260 showing components of the base 210 in one example. According to an example, the base 210 can hold the body 205 in place, while also providing a mechanism to maintain the indication device 260 in a proper position or orientation. For example, the base 210 can include a covering and underneath the covering, a compressible foam spacer 265 and a foot 270. The compressible foam spacer 265 can provide cushioning between the body 205 and the bottom of the base 210 and/or the roof of the vehicle (not shown) so that when the body 205 moves slightly during movement of the vehicle, the body 205 can be cushioned from being damaged. The foot 270 can be coupled to the base 210 and/or the body 205 at a pivot point to enable the foot 270 to move to fit the contours/shape of the different roofs of vehicles. In one example, the foot 270 can also include or one or more fastening components, such as a physical latching device and/or a magnetic component(s), to engage and fasten the base 210 to the roof of the vehicle. The base 210 may have multiple feet 270, though only one is illustrated in FIG. 2F (e.g., a second foot on the right side of the indication device 260).

FIG. 2G illustrates another example of an indication device 280, similar to the indication device 230 of FIG. 2C. In FIG. 2G, the indication device includes a body and a base (or foot) 283. The body is unitarily formed to include a gap (such as seen in FIG. 2C), in which a lighting (LED) matrix or device 281 can be inserted. The LED matrix 281 can be illuminated based on the output configuration data specified by a user. The indication device 280, in this example, includes a light source (e.g., an LED strip) 285 that is positioned under the body and inserted within the foot 283 for providing lighting for the body and/or the LED matrix 281. The power source 287, illustrated herein as a port with a wire, can provide power for the indication device 280 (e.g., provide power to the LED strip 285 and the LED matrix 281). In another example, the power source 287 can be an internal power source, such as a rechargeable battery.

FIG. 2H illustrates an example of an indication device (such as described in FIGS. 1 and 2A through 2G) that is positioned and fastened to a roof of a vehicle. The illustration of FIG. 2H, shows the indication device being illuminated along the edge and on the film or LED matrix of the indication device. Depending on examples, the indication device can be illuminated in this fashion for a duration of time in connection with a transport service. A user, in which a transport service has been arranged for, can be standing outside on a street corner, for example, awaiting for pickup. The user may have specified using the designated service application, a particular output configuration—e.g., yellow lighting. When the vehicle approaches the user, the driver can indicate via input "arriving now," on his or her driver device, thereby causing the indication device to output light in based on the user's output configuration data, as seen in FIG. 2H.

In one example, the indication device can be illuminated in a default color (e.g., white) while the driver is providing transport or driving to pick up a user (e.g., the indication device is in a "neutral state"). When the driver indicates "arriving now," the indication device can fade to the user's specified color (e.g., the indication device is in the "arrival state"). In addition, from this instance in time, as the driver waits for the user to enter the vehicle, the illumination can pulse or periodically fade in and fade out between the user's specified color and the default color (e.g., slowly transition from white to yellow for 2 seconds, maintain the yellow color for 0.5 seconds, and then transition back to white for 2 seconds, etc.). While the driver waits, he or she has not indicated that the transport service has yet begun. During this time, the indication device can provide pulsating or transitioning illumination, as discussed (e.g., the indication device is in the "transition state"). After the user enters the vehicle, the indication device can be illuminated back to the default color or maintained in the user's specified color (e.g., the indication device is in a "transport state"). When the transport service is completed and the driver arrives at the user's destination, the driver can indicate on his or her device, "trip ended," and the indication device can again perform a transitioning illumination operation or output the user's specified color for a duration of time as the user exits, such as 10 seconds (e.g., the indication device is in a "goodbye state"). In this manner, the indication device can provide the user with a personalized experience that gives the user the appearance of a transport service that is specifically tailored for that user.

FIGS. 2I and 2J illustrate example patterns that can be displayed or illuminated on an indication device. In the example illustrated in FIG. 2I, the indication device is provided on a roof of a vehicle (near a peripheral edge of the roof) and near a door, indicating the point of entry for the user for purposes of a transport service. The body of the indication device can include patterns that can be illuminated by the light source based on a user's output configuration. In FIG. 2I, the pattern is a grid pattern that better illuminates the body in a color specified by the user. For example, when the indication device is to illuminate periodically (e.g., pulse from one color to another), the grid pattern can enhance the illumination for the user along with the edge lighting. In another example, FIG. 2J illustrates fade pattern or a grid and fade pattern.

FIGS. 2K through 2O illustrate another example indication device, such as described in FIG. 1. While the indication device illustrated in FIGS. 2A through 2J is shaped to be positioned on top of a vehicle, for example, the indication device 290 can be shaped to be positioned proximate to a window or windshield of the vehicle, such as illustrated in FIGS. 2M, 2N, and/or 2O.

Referring to FIG. 2K, the indication device 290 can have an overall length, L, an overall width, W, and an overall height, H, with the length being significantly greater than the width and the height, and the width being greater than the height. The indication device 290 can include a base 291 and a body 293, which has a length that is shorter than the overall length, L, but has a width and a height that is similar to the overall width, W, and the overall height, H, as the indication device 290. The body 293 can include a façade or surface 294 that extends along the length and the width of the body 293. This façade or surface 294 can be composed of material that enables a light source(s) included in the body 293 (and/or the base 291) to illuminate at least a portion of the façade 294. For example, the façade 294 can include or be composed of a diffusion film or a diffusion mask, and can be held in place by a gasket that makes up at least a portion of a perimeter or housing of the body 293. Depending on implementation, the façade 294 can also have different patterns or textures to enhance the illumination when light is emitted by the indication device 290.

The base 291 of the indication device 290 can be shaped to extend along at least a portion of the length of the body 293 and at least a portion of the width of the body 293. In one example, the base 291 can have a greater length (and/or width) than the body 293, such as illustrated in FIG. 2L. The indication device 290 can also include one or more fastening mechanisms to enable the indication device 290 to adhere or fasten to a surface, so that the façade 294 faces the surface when the indication device 290 is attached to that surface. For example, in FIGS. 2K and 2L, a first fastening mechanism 295 can be coupled to a first end portion of the base 291 (that extends further out lengthwise than the body 293) and can be positioned adjacent to a first end portion of the body 293, while a second fastening mechanism 297 can be coupled to a second end portion of the base 291 (that also extends further out lengthwise than the body 293) and be positioned adjacent to a second end portion of the body 293. The fastening mechanisms 295, 297 can include adhesives on their surfaces (e.g., tape, suction cups, sticky material for adhesion to glass, hook and loop fasteners, etc.) to enable the indication device 290 to adhere to a surface, such as an inner surface of a windshield 298 of a vehicle, such as illustrated in FIG. 2M. By enabling the indication device 290 to be positioned in such a manner, light can be emitted or outputted from the façade 294 in the direction toward the windshield 298.

Each of the fastening mechanisms 295, 297 can also include an attachment mechanism(s) to couple to respective first end and second end portions of the base 291 (see FIG. 2L). The attachment mechanisms, such as clasps, male-female mating mechanisms, and/or magnets, etc., can enable the fastening mechanisms 295, 297 to detach from the base 291. In such an example, the driver can first attach the indication device 290 to a surface of a window using the fastening mechanisms 295, 297, such as illustrated in FIG. 2M. When the driver is no longer using the indication device 290 and wants to put it away, for example, the driver can grab the handle 292 (which extends from a rear surface of the base 291) to take off the indication device 290 from the window. The two fastening mechanisms 295, 297 can remain adhered to the window while decoupling from the base 291, so that the base 291 and the body 293 of the indication device 290 can be removed from the window. In this manner, the driver can easily and quickly attach and take off the indication device 290 from the window at the same position. Still further, in some examples, only one fastening mechanism may be included in the indication device. In the examples illustrated in FIGS. 2K through 2M, however, having two fastening mechanisms 295, 297 can provide additional balance and stability for the indication device 290 when mounted or adhered to a surface of a window.

In some examples, at least one or more of the base 291, the body 293, or the fastening mechanisms 295, 297 can include or house one or more electrical components (e.g., light source(s), device controller circuitry, ports/interfaces, wires, electrical contacts, etc.). For example, as illustrated in FIG. 2L, the fastening mechanism 297 can include circuitry, such as a power and/or a data interface, to receive power from a cable (or to house a power source) and/or to receive data from the computing device, such as a driver's device. The fastening mechanism 297 can include a first power and/or data connection (e.g., a first set of contacts) to mate with a second set of contacts 296 of the base 291. In this manner, the fastening mechanism 297 can enable power and/or data to be provided to the indication device 290 when connected to the base 291 (e.g., when the base 291 and the body 293 are attached or mounted, via the one or more fastening mechanisms 295, 297, to the surface of a window).

As an addition or an alternative, different fastening mechanisms can be used to attach the indication device 290 to a vehicle. For example, in FIG. 2N, the indication device 290 may not have the set of fastening mechanisms 295, 297, as described in FIGS. 2K through 2M, but instead can have one or more fastening mechanisms 299a, 299b that attach the indication device 290 to a peripheral edge or surface of the interior of a vehicle so that the façade 294 faces and is proximate to the inner surface of the windshield. Each fastening mechanisms 299a, 299b can correspond to a set of magnets or a set of other coupling devices in which a first magnet or coupling device remains attached to the peripheral edge of the vehicle and a second corresponding magnet or coupling device is coupled to the base 291 or the body 293 of the indication device 290. In this manner, when the indication device 290 is properly attached to the peripheral edge of the vehicle, the indication device 290 can be positioned with respect to the inner surface of the windshield similar to the position of the indication device 290 as illustrated in FIG. 2M.

In another example, referring to FIG. 2O, the fastening mechanism 299c can be a hinge (or multiple hinges) that can attach to the peripheral edge or surface of the interior of a vehicle so that the façade 294 faces and is proximate to the inner surface of the windshield. The fastening mechanism 299c can enable the indication device 290 to rotate about its length to be hidden from view when not in use (e.g., rotate about its length so that the façade 294 moves away from the inner surface of the windshield. In such examples, of FIGS. 2N and 2O, power and/or data can be provided via the one or more fastening mechanisms 299a, 299b, 299c, or can be provided through a separate cable and/or wireless interface.

The indication device 290 can also be shaped in different ways, depending on variations. For example, the façade 294 of the indication device 290 can be substantially flat or can have a slight curve along its length, such as illustrated in FIG. 2M, so that the indication device 290 can be substantially flush to a vehicle's windshield (which is also slightly curved) when the indication device 290 is mounted or adhered to the inner surface of the windshield. In another example, the base 291 and the body 293 can be composed of material that is at least semi-flexible (e.g., flexible plastics, rubber or rubber-like materials, etc.) so as to enable the indication device 290 to flex along its length, width, and/or height.

Depending on implementation, the indication device 290 can have a variety of different light sources and/or different arrangements for the light source(s). In one example, the indication device 290 can be backlit using different light-producing devices, can include an array of light elements, such as bulbs, light-emitting diodes (LEDs), light-emitting electrochemical cells (LECs), and/or can include a display device, such as a touch-sensitive display device, a LED display, an liquid crystal display (LCD) device, etc. Based on power and/or control signals received from a computing device, such as the driver's device, the indication device 290 can be illuminated in a particular manner. In another example, the indication device 290 can be pre-programmed to illuminate in a particular manner when the indication device 290 is turned on, without being connected to or without communicating with the driver's device or the transport personalization system of FIG. 1.

For example, FIGS. 2P through 2R illustrate different illumination arrangements and/or illumination sequences for an indication device, such as described with respect to FIGS. 1 through 2O. The examples shown in FIGS. 2P through 2R depict the front surface or façade (e.g., the façade 294 of the indication device 290 in FIG. 2K) with the façade facing outwards from the inside of a vehicle. In such examples, the indication device 290 can be positioned to abut or be proximate to the inner surface of a windshield, such as near a lateral side of the passenger-side of the interior of the vehicle. The arrows indicate, in some examples, the animation or sequence of illumination of the indication device. Such an animation or sequence of illumination can be caused by control signals from the driver's device (via the output configuration specified by a user, such as described in FIG. 1) or can be pre-programmed in a memory accessible by the device controller of the indication device 290. For example, such illumination sequences can be displayed when the driver is approaching the pickup location of the user and/or when the driver is waiting at the pickup location for the user to enter the vehicle. The illumination sequences can be repeated over and over until the indication device 290 is turned off or until the state of the transport service or driver changes.

Referring to FIG. 2P, the façade of the indication device 290 can include a printed pattern or design (e.g., markings on the façade itself) or can display portions of the design when the light source(s) is illuminated underneath the façade (e.g., in the body 293). The design can enhance the manner in which the indication device 290 is illuminated. In one example, the animation or sequence of illumination can be in a direction going from the bottom of the device to the top of the device so that portions of the façade can be illuminated at different instances in time. In other implementations, the façade can have or display other designs or no design.

In another example, in FIG. 2Q, the indication device 290 can enable discrete portion(s) or segment(s) of the façade to be illuminated in a particular animation or sequence. In this example, the direction of the illumination sequence can start by first illuminating the light source(s) in the middle area of the façade and then dynamically turning off those light source(s) and illuminating the light source(s) towards positioned above and below those light source(s), so that two portions of the façade are illuminated at different instances in time. Still further, in the example of FIG. 2R, the indication device 290 can be enabled to dynamically illuminate different portions of the façade by illuminating different light source(s) of an array and/or controlling the brightness levels of the light source(s).

Methodology

Figure 3:
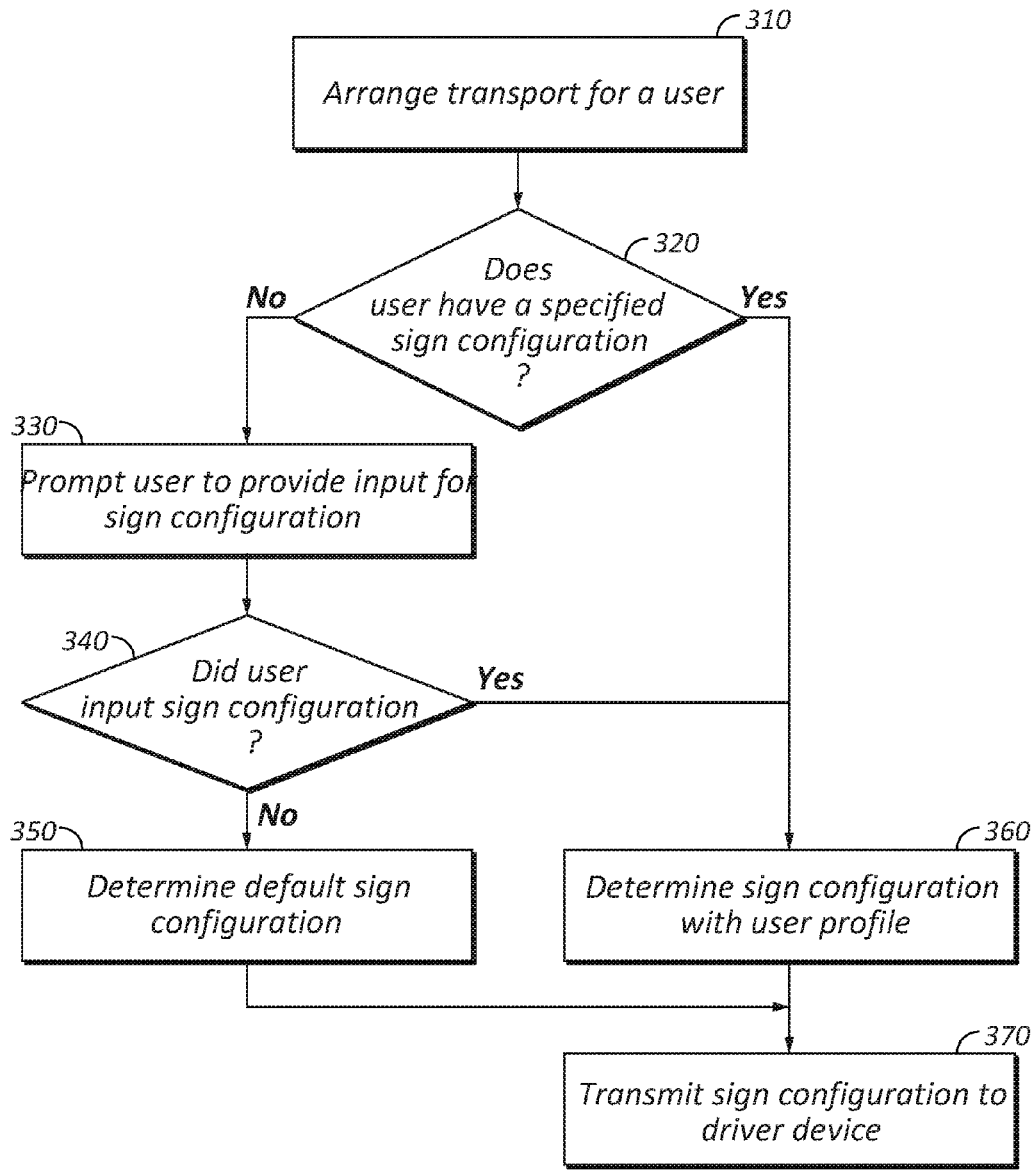
FIG. 3 illustrates an example method for providing configuration information for controlling an indication device for use with an on-demand service.

FIG. 3 illustrates an example method for providing configuration information for controlling an indication device for use with an on-demand service. A method such as described by an example of FIG. 3 can be implemented using, for example, components described with an example of FIG. 1. Accordingly, references made to elements of FIG. 1 are for purposes of illustrating a suitable element or component for performing a step or sub-step being described.

Referring to FIG. 3, the on-demand service system can arrange for a transport service to be provided by a user (310). The user can provide a transport request using a designated service application on her device and the on-demand service system can programmatically select a driver for that user. A transport personalization system that is a part of the on-demand service system and/or in communication with the on-demand service system can determine that the transport has been arranged for the user, and determine whether that user has specified an output configuration for an indication device (320). For example, the transport personalization system can determine the arranged transport service information (e.g., get the trip identifier), determine a user ID for that user, perform a lookup in a client user database for the user's profile using the user ID, and determine whether the user has specified in the profile a particular output configuration for personalizing the transport.

If the user has specified an output configuration, the transport personalization system can retrieve or determine the output configuration from the user's profile (360) and provide data corresponding to the output configuration to the driver's device (370). For example, the transport personalization system can determine the driver's identifier that is to provide the transport for the user from the arranged transport service information and identify the driver's device. If the user has not specified an output configuration, on the other hand, the transport personalization system can provide a message (e.g., an in-app message) to the user's device prompting the user to provide an output configuration for the indication device (330).

The prompt can indicate to the user that the user may specify the output configuration if the user would like. The user can interact with the in-app message (e.g., that is displayed by the designated service application) in order to access the different configuration(s) that can be selected by the user. If the user inputs the output configuration (340), the transport personalization system can receive and determine the output configuration (360) and store the output configuration with the user's profile for future use. The transport personalization system can then transmit the output configuration to the appropriate driver device (370).

If the user chooses not to input or select an output configuration, the transport personalization system can determine that the default output configuration is to be used by the driver (350). In that case, the transport personalization system can transmit the default output configuration to the driver device (370). As an alternative, the transport personalization system does not transmit any output configuration to the driver device, and the driver device automatically uses the default output configuration. The driver's device can use the output configuration to adjust the illumination and/or display of the indication device for purposes of providing personalized transport services for the user (e.g., by providing control signals from the driver's device to the indication device using a communication interface).

As an addition or an alternative, the system and/or the driver service application can determine the output configuration used to control the indication devices (e.g., without user control or preference). For example, the output configuration can be based on the current state of the transport service without taking into consideration user-specified colors, patterns, or sequences of illumination. The driver service application can store the output configuration data with predetermined transport service/driver status information so that the driver service application can control the indication device when it detects a certain state of the transport service or driver. In other examples where the system determines the state, the system can transmit predetermined output configuration data to the driver device corresponding to the detected state in order to cause the driver's device to control the indication device accordingly.

Still further, in some examples, the indication device can include memory that store pre-programmed data that controls the manner in which the indication device illuminates its façade or blade-like surfaces. The indication device may receive state information from the driver device and the device controller of the indication device can control the illumination based on the received state information. In another example, a connection between the indication device and the driver's device may not be necessary as the indication device can illuminate in a specified pre-programmed manner when the indicating device is turned on (such that the illumination is not based on user-specified preferences or the state of the transport service).

User Interface

Figure 4A:
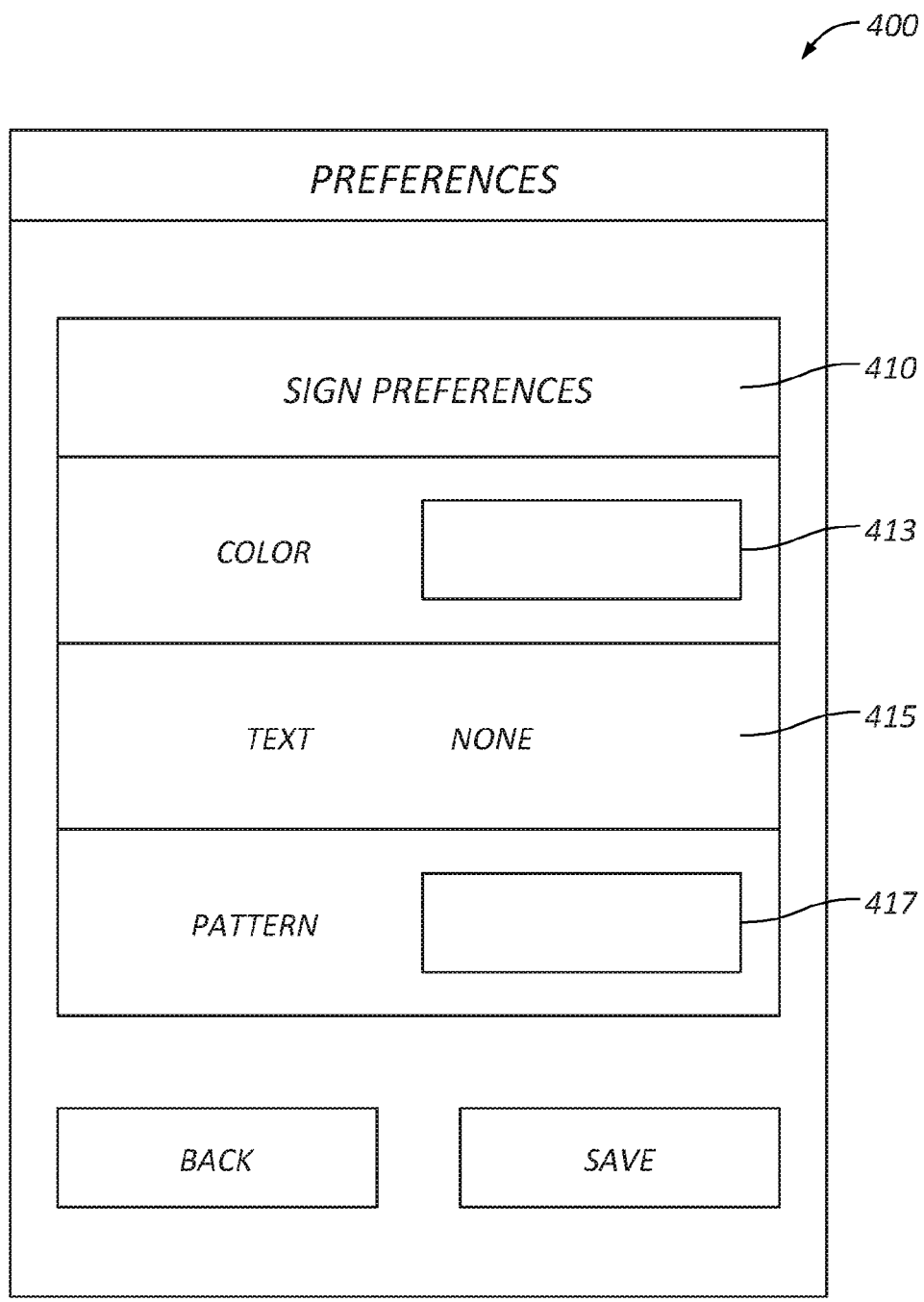
FIGS. 4A and 4B are example user interfaces depicting a service application that is operated on a computing device.
Figure 4B:
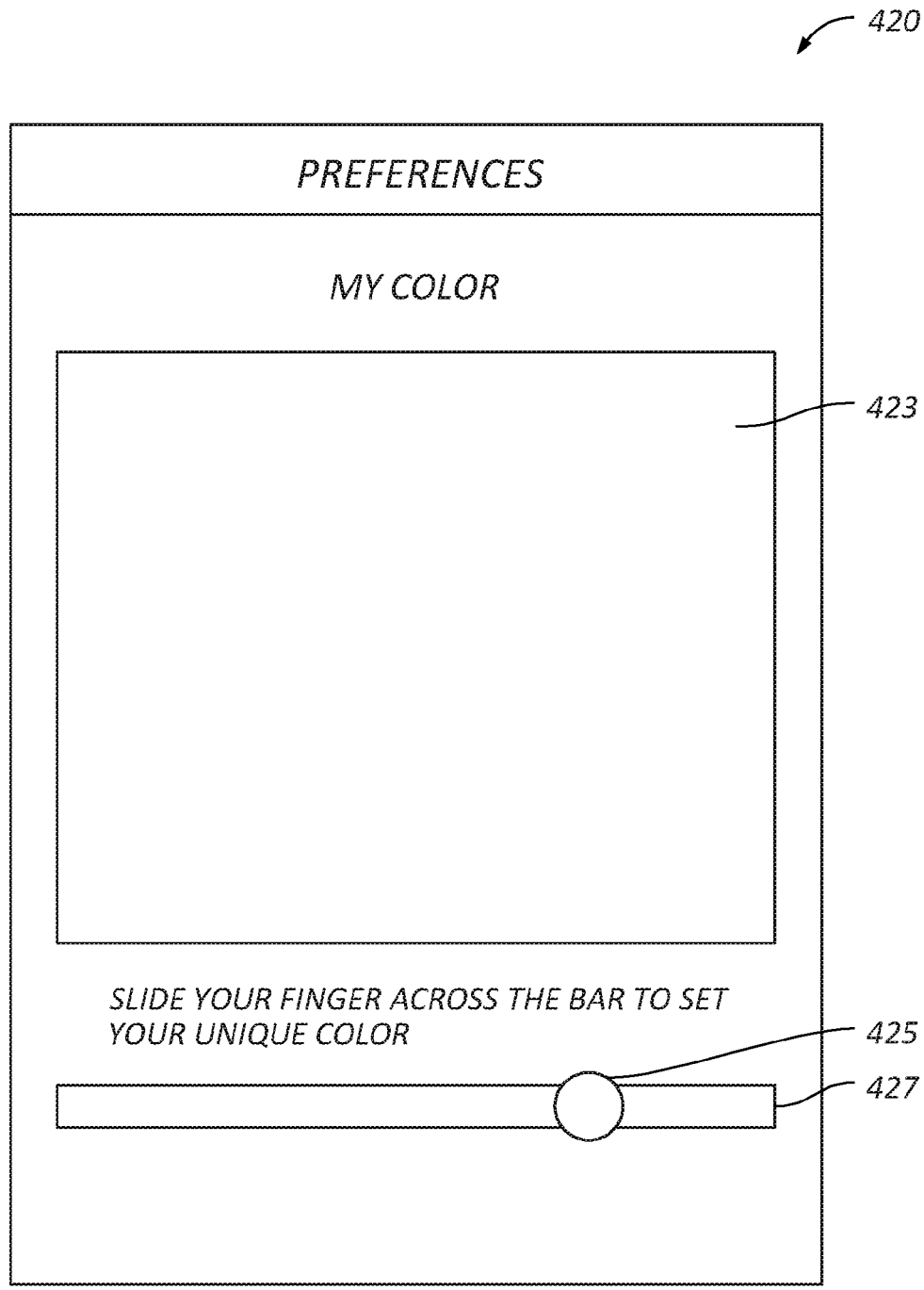

FIGS. 4A and 4B are example user interfaces depicting a service application that is operated on a computing device. The user interfaces 400, 420, such as described in examples of FIGS. 4A and 4B, respectively, can be provided using, for example, components described with an example of FIG. 1. In one example, the user interface 400, 420 can each correspond to a user interface that is displayed on a mobile computing device of a client device as part of a designated service application.

In FIG. 4A, a service application running on a client device can provide a user interface to enable a user to update or modify the user's profile (or account) using the client device. The user can access the user's profile and make edits to the profile by interacting with the service application. In one example, the user can adjust one or more preferences in the user's profile, such as sign (or output) preferences for an indication device. The user interface 400 can display a sign preference user interface 410 in which the user can adjust one or more output configurations for an indication device. For example, the user can adjust the color 413, the text (if any or if possible) 415, and/or the pattern 417 of the output configuration.

When the user selects the feature 413 to adjust or select the color, the user interface 420 of FIG. 4B can be displayed on the client device. The user interface 420 can include a region 423 showing the current color selected by the user and a selection bar 427 in which the user can move the color indicator 425 to select the color. The selection bar 427 can display a spectrum of colors (e.g., from red to orange to yellow to green to blue to violet, etc., and anything in between) from left to right, for example, and when the user moves the color indicator 425 along the selection bar 427, the selected color can dynamically change in the region 423. The user can select any color from a full RBG spectrum. Once the user accepts the color by selecting a "accept" feature on the user interface 420 (not illustrated in FIG. 4B), the user interface 400 can be displayed again to the user. The selected color can be presented in the rectangular region of the feature 413 showing the current selected color for the user. In addition, the user's configured preferences for the output configuration can be stored with the user's profile or account so that the transport personalization system can access the user's specific configuration without prompting the user. The user does not have to provide configuration information again unless the user wants to make changes.

Although not illustrated in FIGS. 4A and 4B, when the user opens or launches the service application on his or her client device at a later time, the service application can also be tailored to the user's selected color. For example, a welcome message in a badge graphic can be provided on the display in the selected color, thereby providing the user with a full personalized experience from the initial launching of the application to the transport service itself. The user can edit or change the selected color at any time by accessing the user's profile from the client device or by logging in to the user's account from another device.

Hardware Diagram

Figure 5:
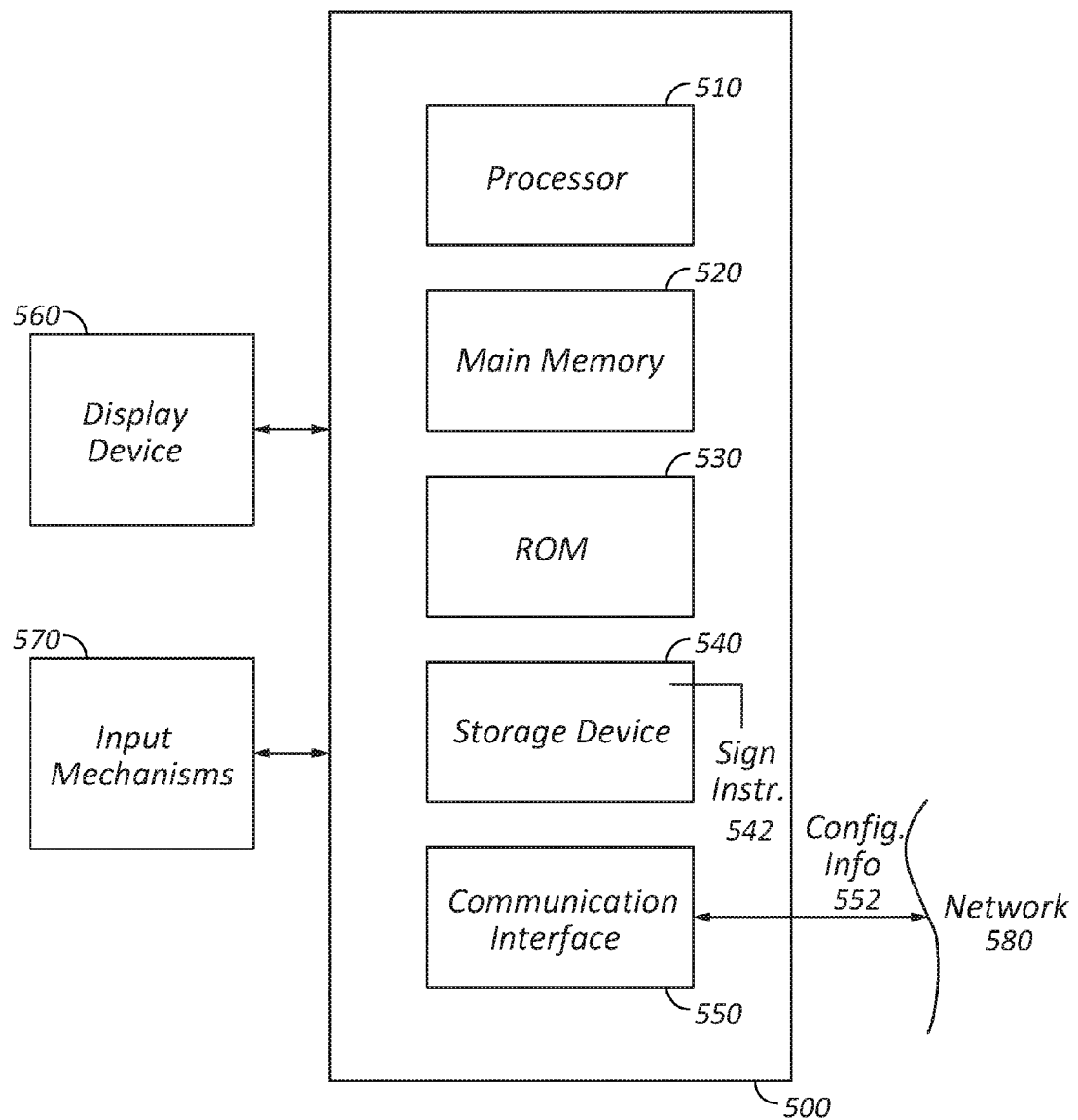
FIG. 5 is a block diagram that illustrates a computer system upon which examples described herein may be implemented.

FIG. 5 is a block diagram that illustrates a computer system upon which examples described herein may be implemented. For example, in the context of FIG. 1, the system 100 may be implemented using a computer system such as described by FIG. 5. The system 100 may also be implemented using a combination of multiple computer systems as described by FIG. 5.

In one implementation, the computer system 500 includes processing resources 510, a main memory 220, a read-only memory (ROM) 530, a storage device 540, and a communication interface 550. The computer system 500 includes at least one processor 510 for processing information and a main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. The storage device 540, such as a solid-state device, a magnetic disk, or an optical disk, is provided for storing information and instructions. For example, the storage device 540 can correspond to a computer-readable medium that stores sign (output configuration) instructions 542 for performing operations discussed with respect to FIGS. 1 through 4B. In another example, the storage device 540 can store user and/or profiles or accounts, such as discussed with respect to FIGS. 1 through 4B. The processor 510 can perform a search of a database of user profiles or accounts to determine whether a user has specified output configurations for controlling an indication device during the progress of a transport service, such as described with FIGS. 1 through 2B.

The communication interface 550 can enable the computer system 500 to communicate with one or more networks 580 (e.g., cellular network) through use of the network link (wireless and/or using a wire). Using the network link, the computer system 500 can communicate with a plurality of devices, such as the mobile computing devices of the clients and service providers. According to some examples, the computer system 500 can receive configuration information 552 from a client device when the user provides a selection or configures the output configuration for an indication device via the network link. The processor 510 can associate the configuration information 552 with the user's profile and store the configuration information in the storage device 540, for example, and provide the configuration information to the driver's device if a transport service is arranged for that user. If a transport service is arranged for the user and a driver, the processor 510 can identify the user's configuration information 552 from memory, for example, and transmit the configuration information 552 to the specific driver's device. The driver's device can use the configuration information to control the illumination or display of the indication device in possession of the driver.

The computer system 500 can also include a display device 560, such as a cathode ray tube (CRT), an LCD monitor, or a television set, for example, for displaying graphics and information to a user. An input mechanism 570, such as a keyboard that includes alphanumeric keys and other keys, can be coupled to the computer system 500 for communicating information and command selections to the processor 510. Other non-limiting, illustrative examples of input mechanisms 570 include a mouse, a trackball, touch-sensitive screen, or cursor direction keys for communicating direction information and command selections to the processor 510 and for controlling cursor movement on the display 560.

Examples described herein are related to the use of the computer system 500 for implementing the techniques described herein. According to one example, those techniques are performed by the computer system 500 in response to the processor 510 executing one or more sequences of one or more instructions contained in the main memory 520, such as the sign instructions 542. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
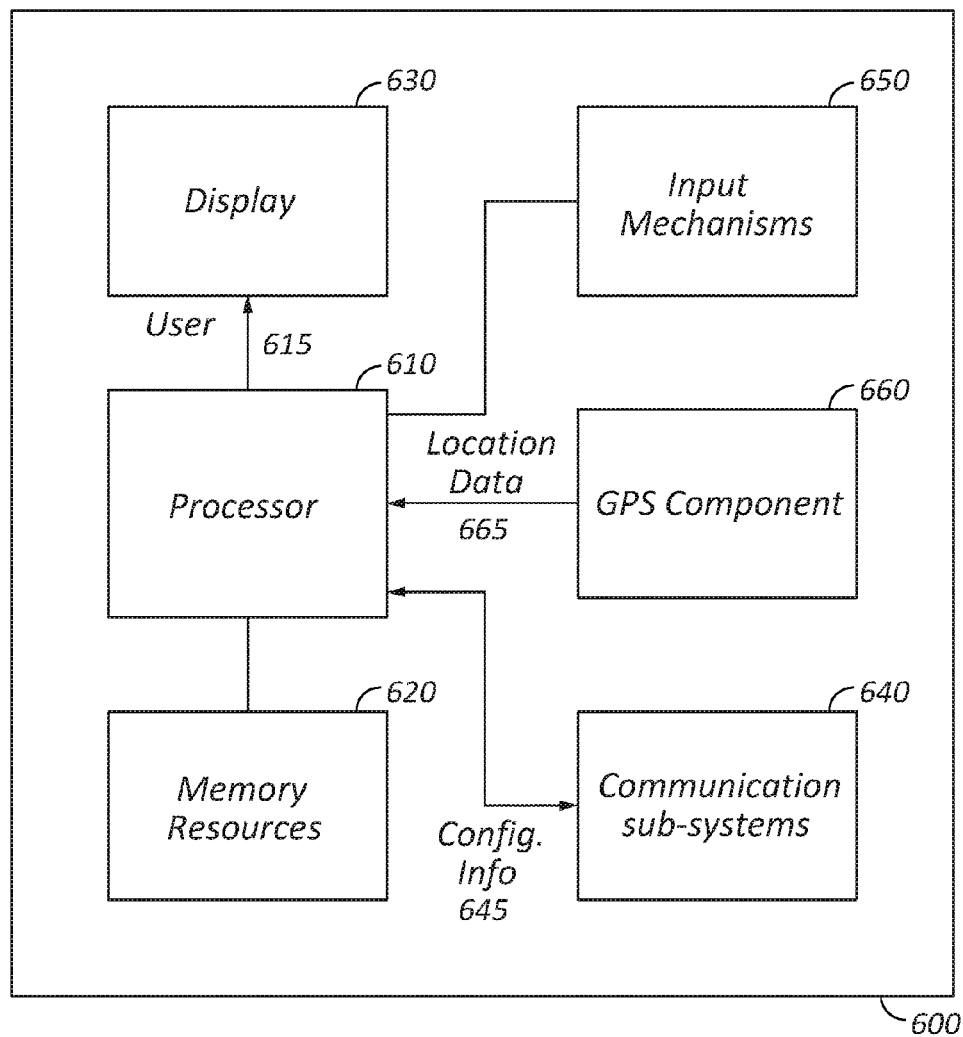
FIG. 6 is a block diagram that illustrates a mobile computing device upon which examples described herein may be implemented.

FIG. 6 is a block diagram that illustrates a mobile computing device upon which examples described herein may be implemented. In one example, a mobile computing device 600 may correspond to a mobile computing device, such as a cellular device that is capable of telephony, messaging, and data services. The mobile computing device 600 can correspond to a client device or a driver device. Examples of such devices include smartphones, handsets or tablet devices for cellular carriers. The mobile computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more location detection mechanisms (e.g., GPS component) 660. In one example, at least one of the communication sub-systems 640 sends and receives cellular data over data channels and voice channels.

The processor 610 is configured with software and/or other logic to perform one or more processes, steps and other functions described with implementations, such as described by FIGS. 1 through 5, and elsewhere in the application. The processor 610 is configured, with instructions and data stored in the memory resources 620, to operate a service application as described in FIGS. 1 through 5. For example, instructions for operating the client service application (when the mobile computing device 600 corresponds to a client device) or the driver service application (when the mobile computing device 600 corresponds to a driver device) can be stored in the memory resources 620 of the mobile computing device 600.

The processor 610 can provide a variety of content to the display 630 by executing instructions and/or applications that are stored in the memory resources 620. One or more user interfaces 615 can be provided by the processor 610, such as a user interface for the service application. A user, for example, can operate a mobile computing device (such as the mobile computing device 600) to operate a client service application. The GPS component 670 can determine location information, such as the current location information 665 of the computing device 600. The user can make a transport request using the location information 665, as a pick up location, for example, and provide the transport request to the on-demand service system via the communication sub-systems 640. The user can also operate a user interface 615 provided as part of the service application in order to input output configuration preferences of the user. The configuration information 645 can be provided to the on-demand service system and stored with the user's profile.

In another example, for a driver device, the memory resources 620 can store data corresponding to the driver service application. The GPS component 670 can determine location information, such as the current location information 665 of the computing device 600, and the operation of the driver service application can cause the location information 665 to be periodically determined and communicated to the on-demand service system (and/or the transport personalization system) via the communication sub-systems 640. In addition, for a driver device, the driver service application can receive the configuration information 645 (for a user that the driver is to provide transports service for) from the on-demand service system (and/or the transport personalization system) and based on the configuration information 645, control an indication device (not shown in FIG. 6) that is connected (e.g., via a wire or wirelessly) with the mobile computing device 600. While FIG. 6 is illustrated for a mobile computing device, one or more examples may be implemented on other types of devices, including full-functional computers, such as laptops and desktops (e.g., PC).

Figure 7:
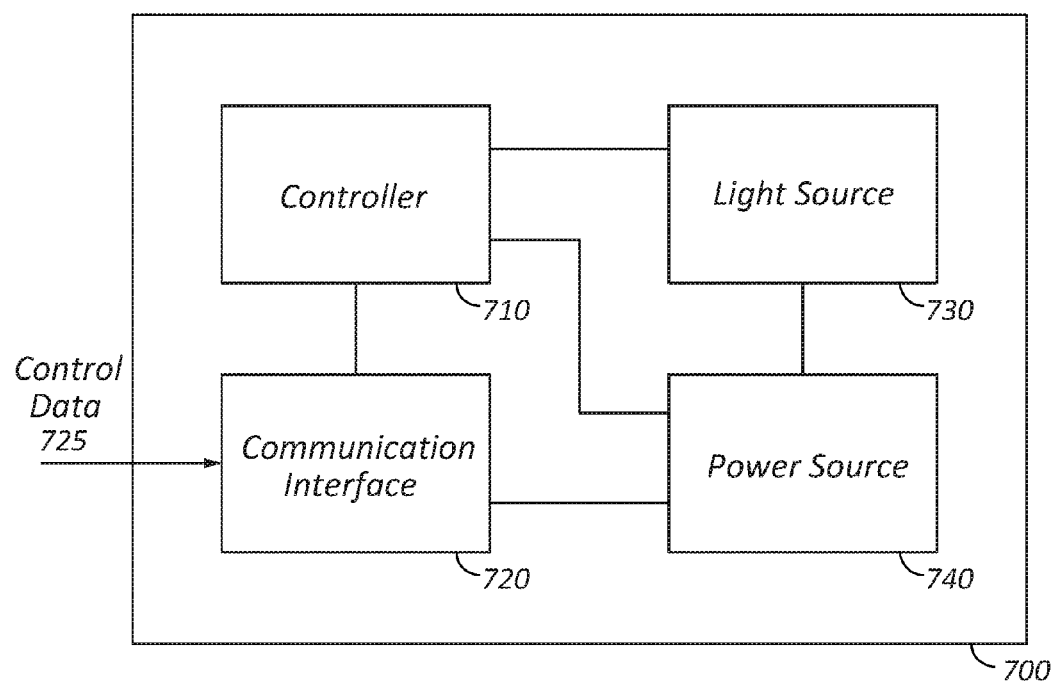
FIG. 7 is a block diagram that illustrates an indication device upon which examples described herein may be implemented.

FIG. 7 is a block diagram that illustrates an indication device upon which examples described herein may be implemented. For example, in the context of FIGS. 1 through 2R, an indication device may be implemented using the device such as described by FIG. 7. The indication device 700 can comprise a base and a body, and other housing features, such as described in FIGS. 2A through 2R. The indication device 700 can also include within or as part of the base, the body, and/or the fastening mechanisms, a controller 710, a communication interface 720, a light source(s) 730, and a power source 740.

The power source 740 provides power to the components of the indication device 700. The power source 740 can be an internal power source, such as a battery, and/or an external power source (e.g., provided by a power source of the vehicle of the driver in possession of the indication device 700 or the driver's device). The light source 730 can be one or more individual light sources, an electroluminescence (EL) element(s), and/or a display device, as described with FIGS. 1 through 2R.

In some examples, the indication device 700 can receive control data 725 via the communication interface 720 from a wirelessly connected (or connected via wire) driver device (not shown in FIG. 7). The control data 725 can be provided by the driver device in order to control the illumination and/or display of the indication device 700 based on the user's specified output configuration information. For example, the control data 725 can cause the controller 710 to illuminate the light source(s) 730 in a particular color, in a particular pattern, and/or operate the light source(s) in different states as described, for example, in FIGS. 1 through 2R. The indication device 700 can also include other components (not shown in FIG. 7), such as one or more ports or contacts, one or more sensors (e.g., an INU, a GPS receiver), speakers, one or more switches to turn on or off the indication device 700, etc.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computer system comprising:
   a non-transitory memory to store instructions;
   one or more processors to access the instructions to:
     determine that a transport service vehicle is within a threshold distance of a location where a transport service is to be received by a given user; and
     trigger an indication device that is externally visible from the transport service vehicle to illuminate in accordance with an output configuration as the transport service vehicle progresses to the location, wherein the output configuration is selected based on data associated with the given user.

2. The computer system of claim 1, wherein the computer system corresponds to a mobile computing device of a driver of the transport service vehicle.

3. The computer system of claim 1, wherein the computer system corresponds to an in-vehicle computer system.

4. The computer system of claim 1, wherein the one or more processors trigger the indication device in response to determining that the transport service vehicle is within the threshold distance of the location.

5. The computer system of claim 1, wherein the one or more processors determine that the transport service vehicle is within the threshold distance by communicating with a network service system that arranges for the transport service vehicle to provide the given user with the transport service.

6. The computer system of claim 1, wherein the output configuration includes at least one of a color, text, or pattern.

7. The computer system of claim 1, wherein the one or more processors communicate with a network service system to receive information for determining the output configuration.

8. The computer system of claim 1, wherein the one or more processors receive, via one or more networks, an input from a driver of the transport service vehicle to associate the output configuration with the given user.

9. A method for providing transport services, the method being implemented by one or more processors and comprising:
 determining that a transport service vehicle is within a threshold distance of a location where a transport service is to be received by a given user; and
 triggering an indication device that is externally visible from the transport service vehicle to illuminate in accordance with an output configuration as the transport service vehicle progresses to the location, wherein the output configuration is selected based on data associated with the given user.

10. The method of claim 9, wherein the method is performed on a mobile computing device of a driver of the transport service vehicle.

11. The method of claim 9, wherein the method is performed on an in-vehicle computer system.

12. The method of claim 9, wherein triggering the indication device is performed in response to determining that the transport service vehicle is within the threshold distance of the location.

13. The method of claim 9, wherein determining that the transport service vehicle is within the threshold distance includes communicating with a network service system that arranges for the transport service vehicle to provide the given user with the transport service.

14. The method of claim 9, wherein the output configuration includes at least one of a color, text, or pattern.

15. The method of claim 9, wherein the one or more processors communicate with a network service system to receive information for determining the output configuration.

16. The method of claim 9, wherein the one or more processors receive, via one or more networks, an input from a driver of the transport service vehicle to associate the output configuration with the given user.

17. A non-transitory computer-readable medium that stores instructions, which when executed by one or more processors of a computer system, causes the computer system to perform operations that include:
 determining that a transport service vehicle is within a threshold distance of a location where a transport service is to be received by a given user; and
 triggering an indication device that is externally visible from the transport service vehicle to illuminate in accordance with an output configuration as the transport service vehicle progresses to the location, wherein the output configuration is selected based on data associated with the given user.

18. The non-transitory computer-readable medium of claim 17, wherein the computer system includes a mobile computing device of a driver of the transport service vehicle.

19. The non-transitory computer-readable medium of claim 17, wherein the computer system includes an in-vehicle computer system.

20. The non-transitory computer-readable medium of claim 17, wherein the output configuration includes at least one of a color, text, or pattern.

* * * * *